United States Patent
Kimura et al.

(10) Patent No.: US 12,097,872 B2
(45) Date of Patent: Sep. 24, 2024

(54) DRIVER ASSISTANCE APPARATUS AND VEHICLE

(71) Applicant: HONDA MOTOR CO., LTD., Tokyo (JP)

(72) Inventors: Ryo Kimura, Wako (JP); Takahiro Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 18/101,782

(22) Filed: Jan. 26, 2023

(65) Prior Publication Data
US 2023/0271627 A1 Aug. 31, 2023

(30) Foreign Application Priority Data

Feb. 25, 2022 (JP) ................................ 2022-028356

(51) Int. Cl.
*B60Q 1/00* (2006.01)
*B60W 40/08* (2012.01)
(Continued)

(52) U.S. Cl.
CPC ............ *B60W 50/16* (2013.01); *B60W 40/08* (2013.01); *B60W 2050/143* (2013.01);
(Continued)

(58) Field of Classification Search
CPC ................. B60W 50/16; B60W 40/08; B60W 2554/4041; B60W 2540/229;
(Continued)

(56) References Cited

U.S. PATENT DOCUMENTS 5,737,225 A * 4/1998 Schulte ............ G08G 1/096861
701/437
9,758,016 B1 * 9/2017 Baron .................... B60H 1/008
(Continued)

FOREIGN PATENT DOCUMENTS

JP    H11-042988 A    2/1999
JP    2005-035488 A    2/2005
(Continued)

OTHER PUBLICATIONS

Japanese Office Action for Japanese Patent Application No. 2022-028356 mailed Jun. 5, 2023 (partially translated).

*Primary Examiner* — Quang Pham
(74) *Attorney, Agent, or Firm* — Thomas | Horstemeyer, LLP

(57) ABSTRACT

A driver assistance apparatus for assisting driving of a vehicle, comprises: a first detector which detects first state information related to driving of the vehicle; a second detector which detects second state information related to driving of the vehicle; first output circuitry which outputs a first signal based on the first state information; second output circuitry which outputs a second signal based on the second state information; and a controller which controls output of the first output circuitry and the second output circuitry. The controller controls, when the second output circuitry outputs the second signal during output of the first signal by the first output circuitry, the output of the first output circuitry so as to gradually decrease and controls the output of the second output circuitry so as to gradually increase.

21 Claims, 10 Drawing Sheets

(51) Int. Cl.
  *B60W 50/16* (2020.01)
  *B60W 50/14* (2020.01)

(52) U.S. Cl.
  CPC . *B60W 2540/221* (2020.02); *B60W 2540/229* (2020.02); *B60W 2554/4041* (2020.02); *B60W 2554/80* (2020.02)

(58) Field of Classification Search
  CPC ....... B60W 2540/221; B60W 2554/80; B60W 2050/143
  See application file for complete search history.

(56) References Cited

U.S. PATENT DOCUMENTS

| | | | | |
|---|---|---|---|---|
| 10,023,204 | B1* | 7/2018 | Kim | B60Q 9/008 |
| 11,203,317 | B2 | 12/2021 | Nakamura et al. | |
| 2004/0150514 | A1* | 8/2004 | Newman | B60Q 9/008 |
| | | | | 345/7 |
| 2006/0017548 | A1* | 1/2006 | Ozaki | B60Q 1/085 |
| | | | | 340/576 |
| 2015/0035660 | A1* | 2/2015 | Sakakibara | B60Q 5/008 |
| | | | | 340/425.5 |
| 2015/0348378 | A1* | 12/2015 | Obana | A63F 13/28 |
| | | | | 700/94 |
| 2017/0228126 | A1* | 8/2017 | Kim | B60Q 3/18 |
| 2017/0351256 | A1* | 12/2017 | Kumakiri | B60W 60/0053 |
| 2019/0185020 | A1* | 6/2019 | Rubinstein | G06F 16/29 |
| 2019/0263397 | A1* | 8/2019 | Matsunaga | B60W 40/08 |
| 2020/0079400 | A1* | 3/2020 | Ueno | B60W 50/16 |
| 2020/0130674 | A1* | 4/2020 | Youn | B60W 40/02 |
| 2020/0215294 | A1* | 7/2020 | Lee | A61B 5/1176 |
| 2020/0216093 | A1* | 7/2020 | Lee | B60K 35/00 |
| 2020/0290540 | A1* | 9/2020 | Nakamura | B60R 21/01538 |
| 2021/0291682 | A1* | 9/2021 | Sakakibara | B60W 50/14 |
| 2022/0101752 | A1* | 3/2022 | Sumikawa | G07C 5/0833 |
| 2022/0289230 | A1* | 9/2022 | Adachi | B60W 50/16 |

FOREIGN PATENT DOCUMENTS

| | | |
|---|---|---|
| JP | 2019-214334 A | 12/2019 |
| JP | 2020-147257 A | 9/2020 |
| WO | 2018/105114 A1 | 6/2018 |
| WO | 2019/163883 A1 | 8/2019 |
| WO | 2020/066757 A1 | 4/2020 |

* cited by examiner

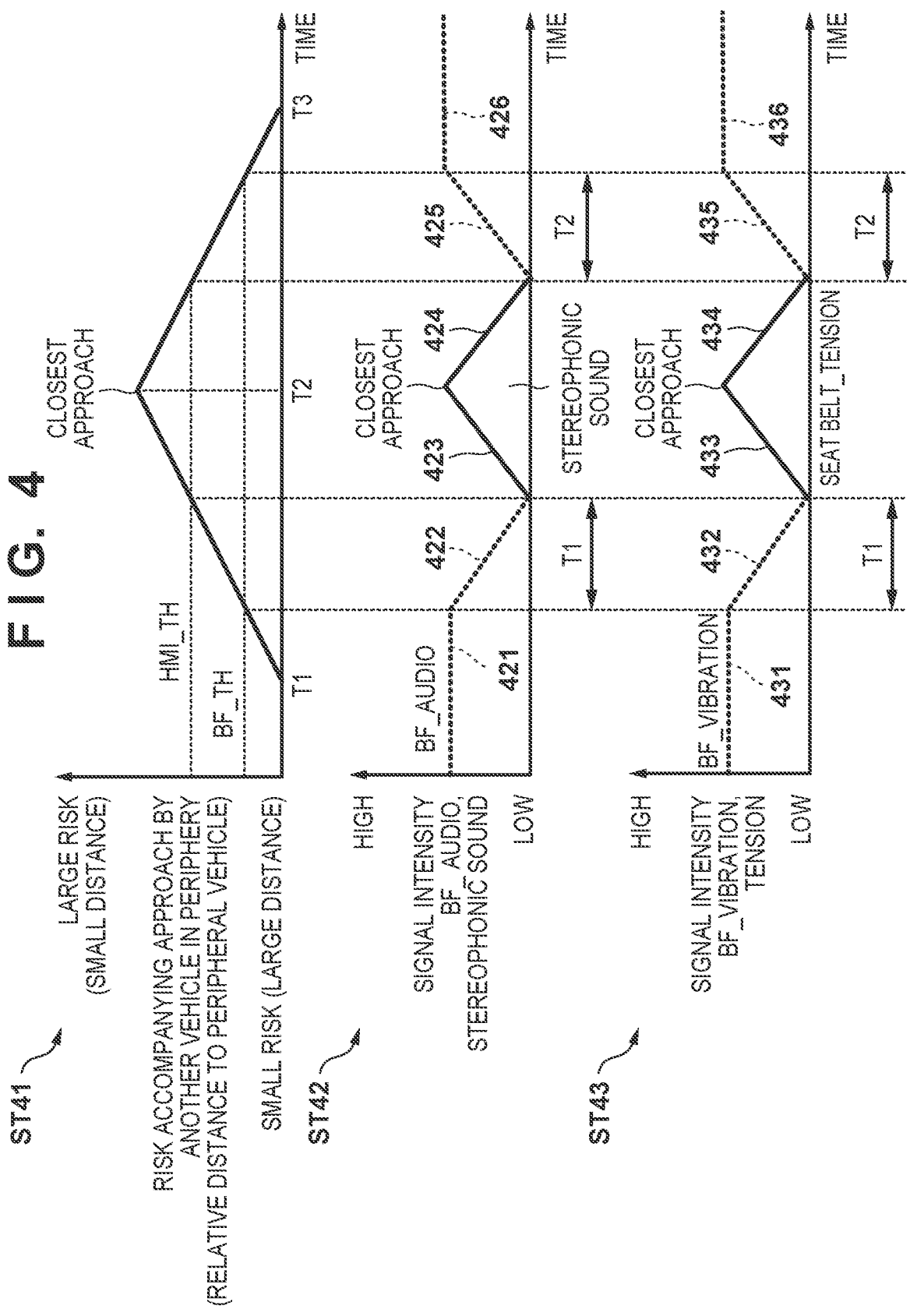

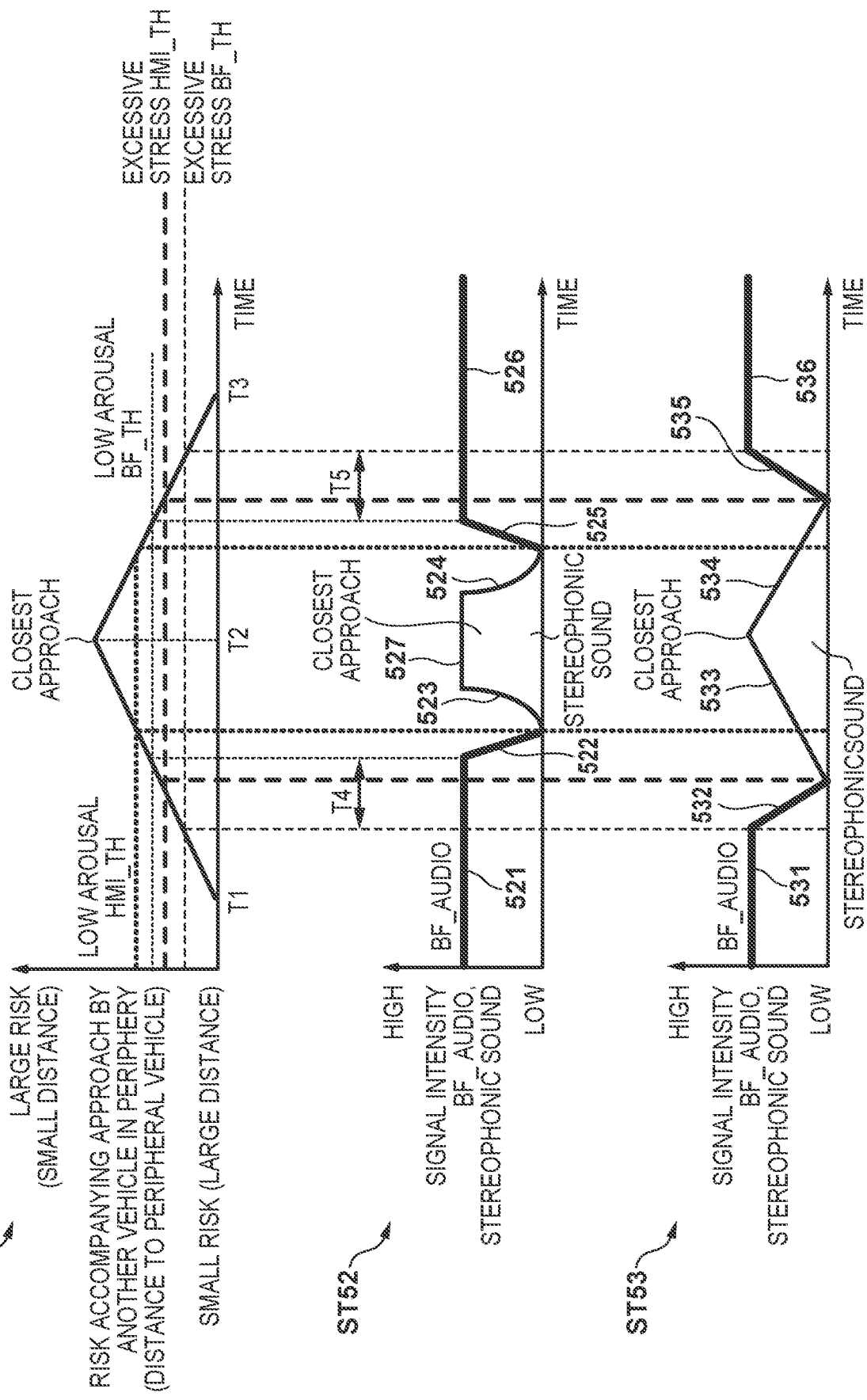

DRIVER ASSISTANCE APPARATUS AND VEHICLE

CROSS-REFERENCE TO RELATED APPLICATION(S)

This application claims priority to and the benefit of Japanese Patent Application No. 2022-028356 filed on Feb. 25, 2022, the entire disclosure of which is incorporated herein by reference.

BACKGROUND OF THE INVENTION

Field of the Invention

The present invention relates to a driver assistance apparatus and a vehicle.

Description of the Related Art

In recent years, efforts to provide access to sustainable transportation systems have been intensifying, and through research and development related to driver assistance technology towards the realization of the provision of such access, there has been a focus on research and development for further improving road safety and transportation convenience. In particular, various techniques are being examined as methods of presenting a driver with risks during driving. For example, Japanese Patent Laid-Open No. 2019-214334 discloses a technique for detecting a level of excitement of a driver from a heartbeat and guiding the heartbeat to a target heart rate using a sound or vibration in order to optimize the state of excitement.

Japanese Patent Laid-Open No. 11-042988 discloses a technique (a stereophonic technique) which, when a vehicle approaches from the rear or from an adjacent lane and a degree of risk increases based on relative positions, outputs an alarm from a direction with a high degree of risk.

In addition, Japanese Patent Laid-Open No. 2020-147257 discloses a technique for increasing (driving) tension of a seat belt according to recognition of a collision (risk).

However, considering that a plurality of risk presentation methods may be implemented in combination, for example, when stimulus signals for risk presentation are generated simultaneously, a driver may be placed under excessive tension due to an information overload. In addition, a situation is also conceivable where effects of the respective stimulus signals in the plurality of risk presentation methods cancel each other out. Furthermore, there may be cases where the driver develops a sense of discomfort when a stimulus signal is suddenly switched to another stimulus signal.

SUMMARY OF THE INVENTION

The present invention provides a driver assistance technique capable of suppressing, from a viewpoint of improving road safety, at least one of: a reduction in effectiveness due to interference of a plurality of signals; placing a driver under excessive stress due to an information overload; and giving the driver a sense of discomfort due to a signal for risk presentation being suddenly switched to another signal.

According to one aspect of the present invention, there is provided a driver assistance apparatus for assisting driving of a vehicle, comprising: a first detector which detects first state information related to driving of the vehicle; a second detector which detects second state information related to driving of the vehicle; first output circuitry which outputs a first signal based on the first state information; second output circuitry which outputs a second signal based on the second state information; and a controller which controls output of the first output circuitry and the second output circuitry, wherein the controller controls, when the second output circuitry outputs the second signal during output of the first signal by the first output circuitry, the output of the first output circuitry so as to gradually decrease and controls the output of the second output circuitry so as to gradually increase.

BRIEF DESCRIPTION OF THE DRAWINGS

FIG. 4 is a diagram showing an example of mutual cooperation of various risk HMIs;

FIG. 5 is a diagram showing an example of mutual cooperation between a first risk HMI and a second risk HMI;

DESCRIPTION OF THE EMBODIMENTS

Figure 1:
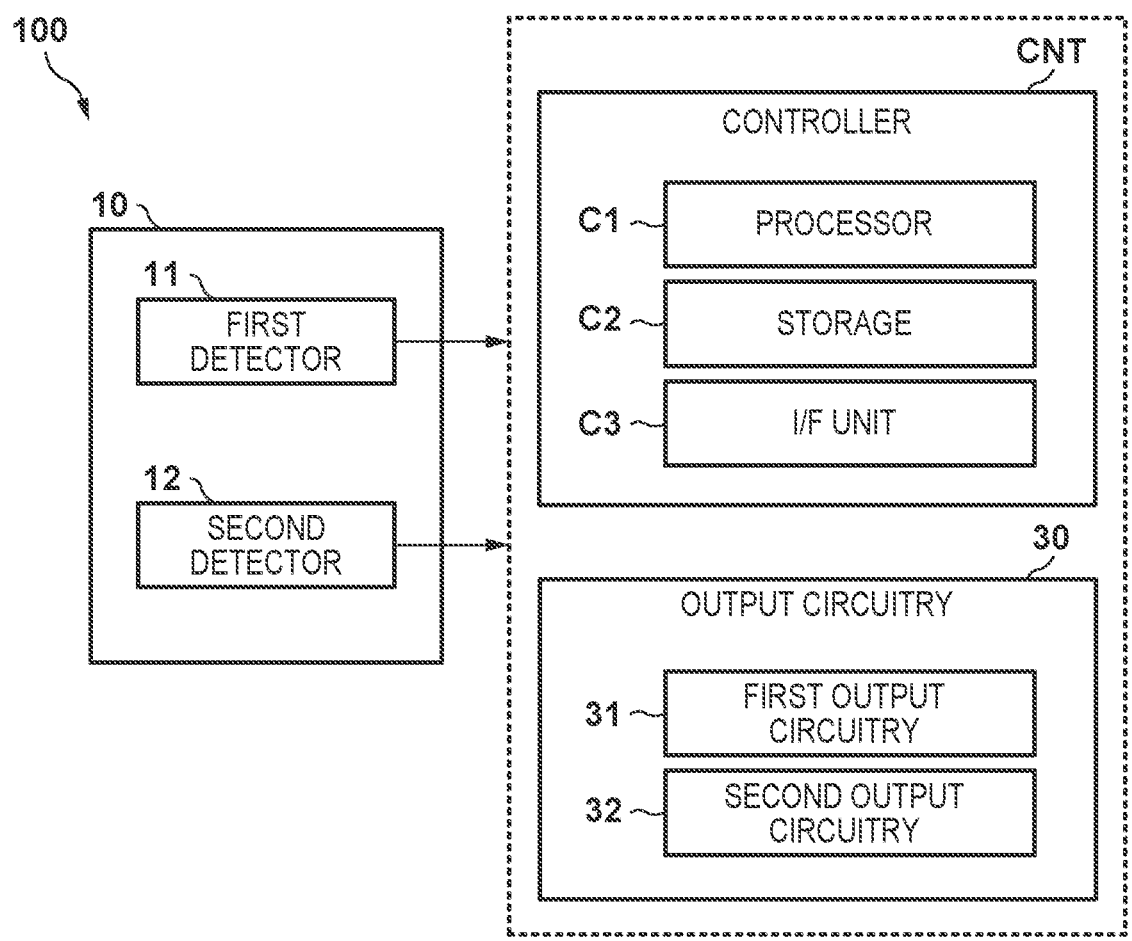
FIG. 1 is a diagram illustrating a basic configuration of a driver assistance apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment (Basic Configuration of Driver Assistance Apparatus)

FIG. 1 is a diagram illustrating a basic configuration of a driver assistance apparatus 100 mounted to a vehicle 200 (FIG. 2) and, as functional components, the driver assistance apparatus 100 includes a detector 10, a controller CNT, and output circuitry 30.

(Detector 10)

The detector 10 includes a first detector 11 and a second detector 12 and detects information (hereinafter, also referred to as biological information) indicating a state of a driver and objects (hereinafter, also simply referred to as a risk or a risk object) present in a periphery of the vehicle 200. For example, objects include various objects (hereinafter, also referred to as peripheral vehicles) such as a two-wheel vehicle or a four-wheel vehicle traveling in the rear, to the side, or in front of the vehicle (self-vehicle). In the present embodiment, information (biological information) indicating a state of the driver and information related to objects (risk objects) present in the periphery of the vehicle 200 (self-vehicle) will be referred to as state information (state quantity).

Figure 2:
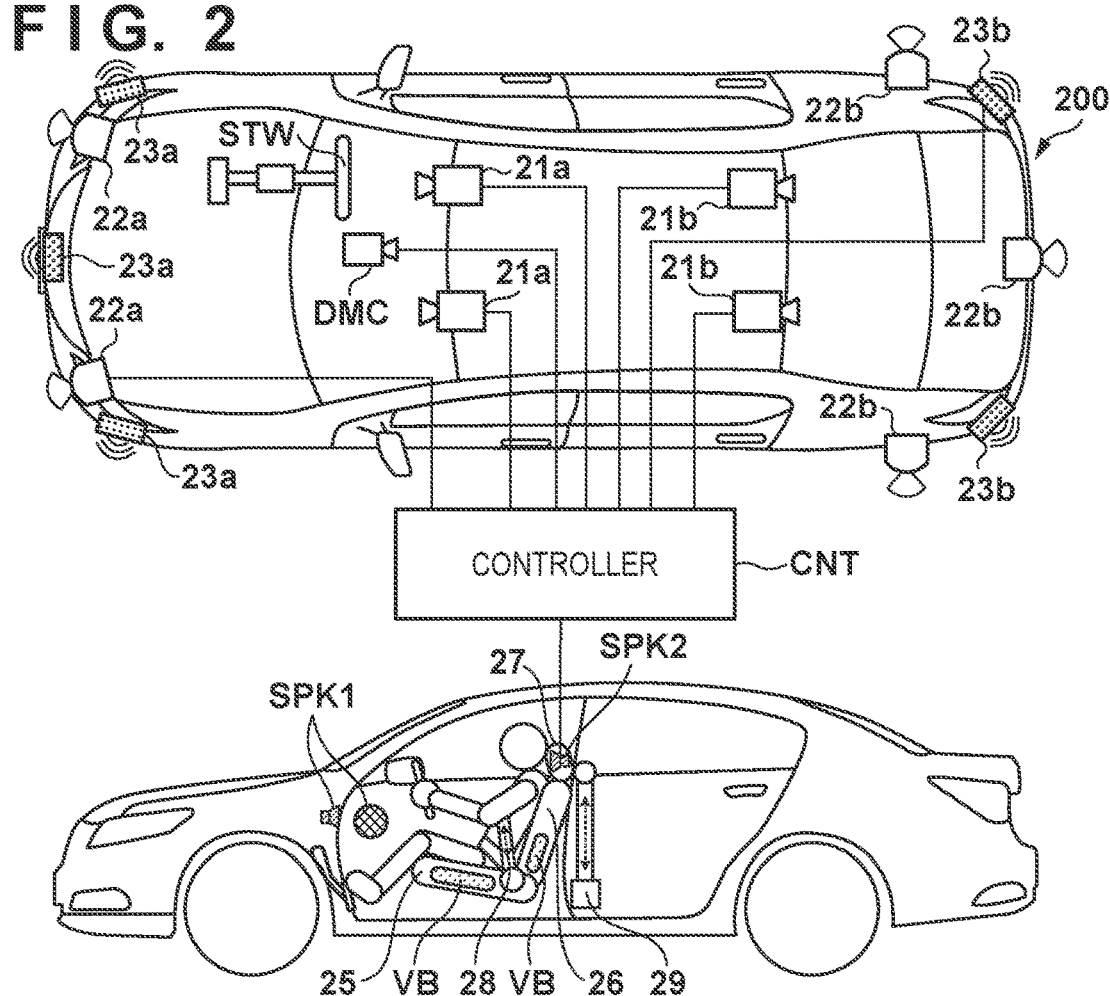
FIG. 2 is a diagram showing an arrangement example of a driver assistance apparatus mounted to a vehicle.

The first detector 11 detects a first state quantity related to driving of the vehicle 200. For example, the first detector 11 is constituted of a sensor provided in a steering wheel STW (FIG. 2), a driver monitoring camera (DMC: FIG. 2) for photographing an outer appearance of the driver in the cabin, a terminal (wearable terminal) mounted to the driver, and the like and the first detector 11 detects biological information correlated with an autonomic state of the driver as the first state quantity. For example, the first detector 11 detects a heart rate (pulse), blinking frequency, or an amount of perspiration of the driver as the first state quantity (biological information).

The second detector 12 detects a second state quantity related to driving of the vehicle 200. For example, the second detector 12 is constituted of a radar detector, a LIDAR detector, and a camera unit for photographing the front or the rear of the vehicle 200, and the second detector 12 detects information for acquiring a distance between an object in a periphery of the vehicle 200 and the vehicle 200 (relative distance) or a relative position of an object in a periphery with respect to the vehicle 200.

FIG. 2 is a diagram showing an arrangement example of the driver assistance apparatus 100 mounted to the vehicle 200. A camera unit 21a, a LIDAR detector 22a, and a radar detector 23a detect an object present in a region in front and a region to the side of the vehicle 200. In addition, a camera unit 21b, a LIDAR detector 22b, and a radar detector 23b detect an object present in a region in the rear and a region to the side of the vehicle 200.

The camera units 21a and 21b are devices that detect an object in the front and in the rear of the vehicle 200. The camera unit 21a is mounted on an inner side of the cabin of a windshield in a front part of a roof of the vehicle 200 so as to be capable of photographing the front of the vehicle 200. In a similar manner, the camera unit 21b is mounted on an inner side of the cabin of a rear windshield in a rear part of the roof of the vehicle 200 so as to be capable of photographing the rear of the vehicle 200. By analyzing images taken by the camera units 21a and 21b, the controller CNT acquires a contour of an object present in front or in the rear of the vehicle 200 and a dividing line (a white line or the like) of a lane on a road.

The LIDAR detectors 22a and 22b are, for example, Light Detection and Ranging (LIDAR) and detect an object (a risk object) in a periphery of the vehicle 200 using light. The controller CNT can measure a distance to the object (risk object) by analyzing information detected by the LIDAR detectors 22a and 22b. For example, one LIDAR detector 22a is provided in each corner in a front part of the vehicle 200, one LIDAR detector 22a is provided at center in a rear part, and one LIDAR detector 22a is provided on each side in the rear part.

The radar detectors 23a and 23b are, for example, millimeter-wave radars and detect an object (a risk object) in a periphery of the vehicle 200 using radio waves. The controller CNT can measure a distance to the object (risk object) by analyzing information detected by the radar detectors 23a and 23b. For example, one radar detector 23a is provided at center in the front part of the vehicle 200, one radar detector 23a is provided in each corner in the front part, and one radar detector 23a is provided in each corner in the rear part.

[Output Circuitry 30]

The output circuitry 30 (output circuit) includes first output circuitry 31 (first output circuit) and second output circuitry 32 (second output circuit), and outputs various signals to the driver based on various state quantities detected by the detector 10. In this case, the signals are signals that stimulate a sense of hearing, a sense of touch, or a sense of vision of the driver and, for example, signals include an audio signal that stimulates the sense of hearing, a signal (vibration signal) for generating vibration that stimulates the sense of touch, and a display signal for displaying a display apparatus 150 (a displayer 151) that stimulates the sense of vision.

For example, with respect to an audio signal, the first output circuitry 31 outputs an audio signal generated from a speaker SPK1 provided inside an instrument panel or on an inner side of a front seat door of the vehicle 200 to the driver. For example, the second output circuitry 32 outputs an audio signal (stereophonic sound) generated from a speaker SPK2 provided in a headrest 27 to the driver.

In addition, with respect to a vibration signal, the first output circuitry 31 outputs a vibration signal to the driver by causing a vibrating element VB provided in a seat 25 (driver's seat) on which the driver sits to vibrate. Furthermore, the second output circuitry 32 outputs a vibration signal to the driver by vibrating a seat belt 28 so that tension of the seat belt 28 increases and decreases in a prescribed period using drive of a vibration generator 29 constituted of a motor or the like.

In addition, with respect to a display signal, the output circuitry 30 outputs a display signal to the driver by displaying the displayer 151 of the display apparatus 150 that displays a signal at a position corresponding to a direction of an object in front.

The first output circuitry 31 outputs a first signal to the driver of the vehicle 200 based on a first state quantity. In addition, the second output circuitry 32 outputs a second signal to the driver of the vehicle 200 based on a second state quantity. Output of the first signal by the first output circuitry 31 and output of the second signal by the second output circuitry 32 will be described later.

(Controller CNT)

The controller CNT includes a processor C1 responsible for processing of the driver assistance apparatus 100, a storage C2 such as a hard disk drive (HDD), an interface (I/F C3), and the like.

The controller CNT controls output of the first output circuitry 31 and the second output circuitry 32. By controlling output of a plurality of signals with different signal intensities, for example, biological information correlated with an autonomic state of the driver can be guided to a numerical range (for example, a threshold range shown in FIG. 3) suitable for driving. In addition, the driver can be notified of the presence of an object (risk object) in a periphery of the vehicle 200 (self-vehicle).

A signal intensity is, for example, in the case of an audio signal, a magnitude of sound (sound pressure) or an interval (period) of sound to be generated. A sound of a period of which is shorter than a predetermined interval (period) is a sound with high intensity, and sound intensity increases as the period decreases. In addition, a sound of a period of which is longer than the predetermined interval (period) is a sound with low intensity, and sound intensity decreases as the period increases.

In addition, the signal intensity is, for example, in the case of a vibration signal, a magnitude (amplitude) of vibration or an interval (period) of vibration to be generated. A vibration a period of which is shorter than a predetermined interval (period) is a vibration with high intensity, and the intensity of vibration increases as the period decreases. Furthermore, a vibration a period of which is longer than the predetermined interval (period) is a vibration with low intensity, and the intensity of vibration decreases as the period increases.

The storage C2 stores a program to be executed by the processor C1, data used by the processor C1 during processing, and the like. In addition, the storage C2 stores various sound source files to be used when the first output circuitry 31 and the second output circuitry 32 output audio signals. The storage C2 stores a plurality of stereophonic sounds (sound source files) corresponding to directions of notification in which a presence of an object that is present in the periphery of the vehicle 200 is notified. Furthermore, the storage C2 stores sound source files (a sound source file for awakening and a sound source file for relaxation) for guiding biological information correlated with an autonomic state of the driver to a numerical range suitable for driving.

The interface (I/F C3) transmits and receives various kinds of data between the detector 10 and the output circuitry 30.

According to an analysis based on information detected by the second detector 12, the controller CNT recognizes (acquires) an object (risk object) that is present in the periphery of the self-vehicle. In addition, the controller CNT acquires a distance between the acquired object (risk object) and the vehicle 200 or a relative position of an object (risk object) in a periphery with respect to the vehicle 200.

Figure 3:
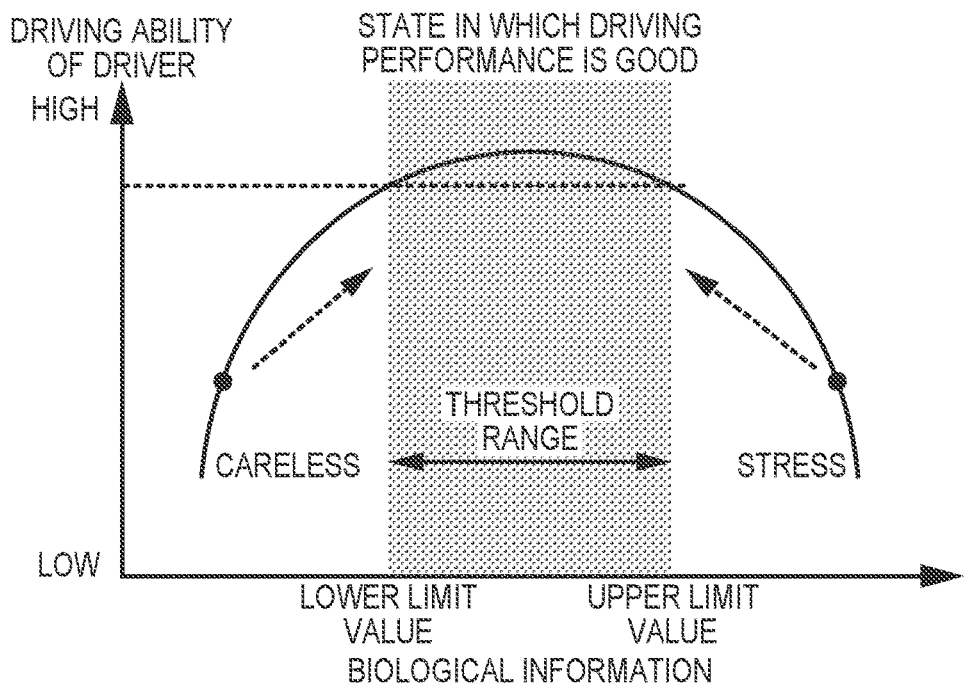
FIG. 3 is a diagram schematically showing a relationship between a driving ability of a driver and biological information of the driver.

Furthermore, based on information (biological information) detected by the first detector 11, the controller CNT determines a biological state (an autonomic state) of the driver such as whether the driver is in a state of carelessness or in a state of tension. For example, by subjecting a facial image of the driver (a photographed image of the driver) input from the driver monitoring camera DMC, information on the driver such as a blinking frequency in a predetermined amount of time can be acquired. In addition, the controller CNT can acquire, by short range wireless communication, information on the driver such as a heart rate (a pulse) or an amount of perspiration of the driver from a sensor provided in the steering wheel STW or a terminal (wearable terminal) mounted to the driver. The controller CNT determines a biological state (an autonomic state) of the driver based on a comparison between any one piece of biological information among the heart rate (a pulse), the amount of perspiration, and the blinking frequency of the driver and a predetermined threshold range (FIG. 3).

(Display Apparatus)

Figure 11:
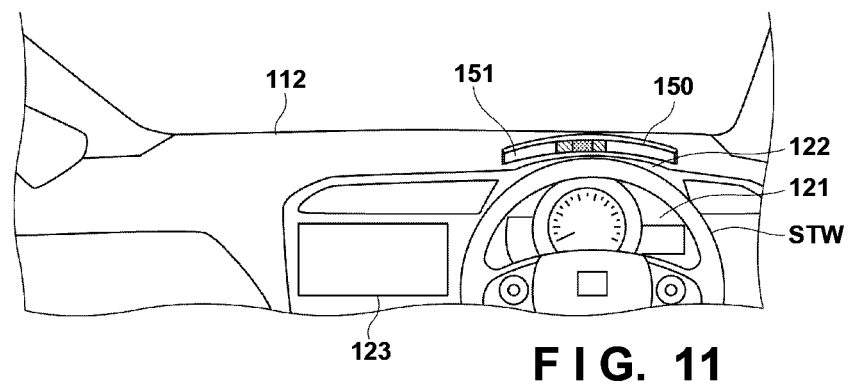
FIG. 11 is a diagram showing a configuration inside a cabin of a vehicle.

FIG. 11 is a diagram showing a configuration inside a cabin of the vehicle 200 when looking ahead from the driver's seat. Various internal components are provided in an instrument panel 112 on a front side in the cabin. For example, the instrument panel 112 is provided with a meter panel 121 that displays a condition, a travel state, or the like of the vehicle 200, navigation 123 that displays information such as map information or audio-related information, and the like. The instrument panel 112 includes a meter shield 122 that covers the meter panel 121 from above. The display apparatus 150 is provided in an upper part of the meter shield 122. The display apparatus 150 includes the displayer 151 on which a plurality of light emitters are arranged. By changing display brightness or a display color of the plurality of light emitters in accordance with a distance to an object in the periphery or a relative position of the object, an intensity of a display signal for stimulating the sense of vision of the driver can be changed.

(Risk HMI)

In the present specification, a notification and/or a warning related to risk during driving with respect to the driver is referred to as a risk HMI (Human Machine Interface). Risks during driving include various risks depending on an environment of a periphery of a vehicle, and there are various risk HMIs suitable for the various risks. Among the various risk HMIs, switching of risk HMIs is controlled in accordance with a biological state of the driver and a state of the peripheral environment so that the various risk HMIs can cooperate with each other.

The various risk HMIs include: (a) a risk HMI with respect to a risk related to the biological state of the driver; (b) a risk HMI for notifying a sign (presence) of a peripheral vehicle (hereinafter, also referred to as another vehicle) present in the rear or to the side of the self-vehicle which cannot be confirmed by the sense of vision; and (c) a risk HMI for notifying another vehicle present in front or to the side of the self-vehicle.

(Risk HMI Related to Biological State of Driver (First Risk HMI))

In driving of a vehicle, there is a biological state (an autonomic state) of the driver which is suitable for driving. FIG. 3 is a diagram schematically showing a relationship between a driving ability (driving performance) of a driver and biological information of the driver and a threshold range represents a range of biological information in which the driving performance of the driver equals or exceeds a criterion value. The state of the driver indicates a biological state suitable for driving as long as the biological information is inside the threshold range. A state of carelessness and a state of tension indicate states outside the threshold range.

The autonomic state is correlated with biological information such as a heartbeat or a pulse of the driver, and it can be said that appropriate biological information satisfying the threshold range means that the autonomic state is also in an appropriate state. Inducing a state where biological information such as a heart rate or a pulse satisfies the threshold range enables the autonomic state to be also guided to an appropriate state.

For example, by applying a stimulus (inductive stimulus) from the outside in a state of carelessness where the heart rate is slow or in a state of tension where the heart rate is fast, biological information changes accordingly (hereinafter, referred to as entrainment). The biological state (autonomic state) of the driver can be controlled by outputting an inductive stimulus to the driver. In the present embodiment, this is referred to as biofeedback (hereinafter, also referred to as BF). Inductive stimuli for performing biofeedback include biofeedback (BF_audio) which uses an audio signal as an inductive stimulus and biofeedback (BF_vibration) which uses a vibration signal as an inductive stimulus.

In a risk HMI (first risk HMI) related to the biological state of the driver, in biofeedback using an audio signal as an inductive stimulus, the first output circuitry 31 outputs an audio signal (BF_audio) for guiding the biological information to a predetermined threshold range as the first signal. In biofeedback using a vibration signal as an inductive stimulus, in order to guide the biological information to a predetermined threshold range, the first output circuitry 31 outputs a vibration signal (BF_vibration) that causes the seat 25 on which the driver sits to vibrate as the first signal.

(Risk HMI for Notifying Sign (Presence) of Object (Second Risk HMI))

In a risk HMI (second risk HMI) for notifying a sign (presence) of another vehicle (object) present in the rear or to the side of the self-vehicle, the second output circuitry 32 outputs a stereophonic sound (audio signal) for notifying the driver of an object present in the periphery of the vehicle 200 as the second signal to the driver from the SPK2. The second output circuitry 32 outputs the stereophonic sound (audio signal) to the driver from the speaker SPK2 in accordance with a direction in which the object is present.

For example, the speaker SPK2 can be provided in the headrest 27 of the seat 25 (driver's seat) on which the driver sits. For example, the speaker SPK2 includes a speaker system capable of outputting stereophonic sound, and the controller CNT outputs an audio signal of the stereophonic sound (sound source file) stored in the storage C2 to the driver from the SPK2 at a predetermined notification timing. The speaker SPK2 reproduces the stereophonic sound (sound source file) input from the controller CNT, outputs the reproduced sound as a stereophonic sound, and notifies the driver of a direction in which the object (risk object) is present. Note that the stereophonic sound is not limited to sound source files stored in the storage C2 and, for example, external environmental sound including a travel sound emitted by an obstacle or a risk object may be collected by a microphone (not illustrated) mounted to the vehicle 200 and output as a stereophonic sound. In other words, the controller CNT may output external environmental sound including a travel sound collected by a microphone to the speaker SPK2 and the speaker SPK2 may output an audio signal of the external environmental sound input from the controller CNT as a stereophonic sound.

Note that an arrangement position of the speaker SPK2 is not limited to the headrest 27 and, for example, the speaker SPK2 may be arranged in a backrest 26 (a position in a vicinity of a shoulder of the driver) of the seat 25 on which the driver sits.

Alternatively, the speaker SPK2 may be an acoustic device including a communicator capable of communicating with the controller CNT. The controller CNT and the communicator of the acoustic device may support short range wireless communication such as Bluetooth®.

For example, the acoustic device may be an audio player that can be carried around by the driver or a wearable terminal apparatus (for example, earphones or eyeglasses with a built-in speaker) that can be worn by the driver. In addition, the direction in which the object (risk object) is present may be notified by combining the speaker SPK2 arranged inside the headrest 27 and a wearable terminal apparatus that can be worn by the driver.

(Risk HMI for Notifying Object in Front or to Side (Third Risk HMI))

In a risk HMI for notifying an object present in front or to the side of the self-vehicle, in order to notify the driver of an object (risk object) present in front or to the side of the vehicle 200, the second output circuitry 32 outputs a vibration signal for changing a tension of the seat belt 28 as the second signal. As the object (risk object) approaches the vehicle 200 (self-vehicle), the second output circuitry 32 outputs a vibration signal so that the tension of the seat belt 28 increases. By vibrating the seat belt 28 so that tension of the seat belt 28 increases and decreases in a prescribed period using drive of the vibration generator 29 constituted of a motor or the like, the second output circuitry 32 outputs a vibration signal to the driver to attract the driver's attention.

(Example of Mutual Cooperation of Various Risk HMIs)

The controller CNT according to the present embodiment controls output of the first output circuitry 31 and the second output circuitry 32. When the second output circuitry 32 outputs the second signal during output of the first signal by the first output circuitry 31, the controller CNT controls the output of the first output circuitry 31 so as to gradually decrease and controls the output of the second output circuitry 32 so as to gradually increase.

The second detector 12 detects a distance (relative distance) between an object in a periphery of the vehicle 200 and the vehicle 200 as the second state quantity and the controller CNT controls output of the second output circuitry 32 so as to change a variation of the second signal (stereophonic sound, seat belt tension) in accordance with a change in a degree of proximity of the object. Based on the distance (relative distance) detected by the second detector 12, the controller CNT controls output of the second output circuitry 32 so that the variation of the second signal increases as the degree of proximity of the object increases and controls output of the second output circuitry 32 so that the variation of the second signal decreases as the degree of proximity of the object decreases.

FIG. 4 is a diagram showing an example of mutual cooperation of various risk HMIs. In FIG. 4, ST41 indicates a relationship between time and a risk accompanying an approach by another vehicle (object) in the periphery. It is shown that, between a time of day T1 and a time of day T2, the other vehicle approaches the vehicle 200 (self-vehicle) and risk increases. It is also shown that, between the time of day T2 and a time of day T3, the other vehicle moves away from the vehicle 200 (self-vehicle) and risk decreases.

(Cooperation of Stimuli of Sense of Hearing)

ST42 indicates an example of mutual cooperation of a case where biofeedback (BF_audio) which uses an audio signal as an inductive stimulus is output in the first risk HMI and a case where a stereophonic sound (audio signal) is output in the second risk HMI. In ST42, the first signal and the second signal are signals that stimulate the sense of hearing of the driver, an axis of abscissa represents time, and an axis of ordinate represents signal intensity.

In a state where the first output circuitry 31 outputs BF_audio as the first signal (421), when the vehicle 200 is approached in such a manner that the second state quantity (relative distance) exceeds a first signal threshold (BF_TH) for biofeedback, the controller CNT controls the first output circuitry 31 so that the first signal (BF_audio) output therefrom gradually decreases (422).

In a state where the second state quantity (relative distance) equals or exceeds a second signal threshold (HMI_TH) for risk HMI which is larger than the first signal threshold (BF_TH), the controller CNT controls the second output circuitry 32 so that the second signal (stereophonic sound) output therefrom gradually increases (423). The controller CNT performs control so that, after the first signal decreases (422), output of the second signal by the second output circuitry 32 gradually increases (423).

As the second state quantity (relative distance) increases and risk decreases, the controller CNT controls the second output circuitry 32 so that the second signal (stereophonic sound) output therefrom gradually decreases (424).

In a state where the second state quantity (relative distance) falls below the second signal threshold (HMI_TH), the controller CNT controls the first output circuitry 31 so that the first signal (BF_audio) output therefrom gradually increases (425). The controller CNT performs control so that, after the second signal decreases (424), output of the first signal by the first output circuitry 31 gradually increases (425).

A control time T1 during which the first signal (BF_audio) is controlled to gradually decrease and a control time T2 during which the first signal (BF_audio) is controlled to gradually increase can be set to any value. In order to notify an increase in risk by outputting a stereophonic sound at an earlier timing, the control time T1 may be set shorter than the control time T2.

In addition, in a state where the second state quantity (relative distance) falls below the first signal threshold (BF_TH), the controller CNT controls the first output circuitry 31 so that the first signal (BF_audio) output therefrom is output at a constant value (426).

(Cooperation of Stimuli of Sense of Touch)

ST43 indicates an example of mutual cooperation of a case where biofeedback (BF_vibration) which uses a vibration signal as an inductive stimulus is output in the first risk HMI and a case where a vibration signal is output in the third risk HMI. In ST43, the first signal and the second signal are signals that stimulate the sense of touch of the driver, an axis of abscissa represents time, and an axis of ordinate represents signal intensity.

In a state where the first output circuitry 31 outputs BF_vibration as the first signal (431), when the vehicle 200 is approached in such a manner that the second state quantity (relative distance) exceeds a first signal threshold (BF_TH) for biofeedback, the controller CNT controls the first output circuitry 31 so that the first signal (BF_vibration) output therefrom gradually decreases (432).

In a state where the second state quantity (relative distance) equals or exceeds a second signal threshold (HMI_TH) for risk HMI which is larger than the first signal threshold (BF_TH), the controller CNT controls the second output circuitry 32 so that the second signal (seat belt tension) output therefrom gradually increases (433). The controller CNT performs control so that, after the first signal decreases (432), output of the second signal by the second output circuitry 32 gradually increases (433).

As the second state quantity (relative distance) increases and risk decreases, the controller CNT controls the second output circuitry 32 so that the second signal (seat belt tension) output therefrom gradually decreases (434).

In a state where the second state quantity (relative distance) falls below the second signal threshold (HMI_TH), the controller CNT controls the first output circuitry 31 so that the first signal (BF_vibration) output therefrom gradually increases (435). The controller CNT performs control so that, after the second signal decreases (434), output of the first signal by the first output circuitry 31 gradually increases (435).

In this case, a control time T1 during which the first signal (BF_vibration) is controlled to gradually decrease and a control time T2 during which the first signal (BF_vibration) is controlled to gradually increase can be set to any value. In order to notify an increase in risk by outputting a vibration signal for causing seat belt tension to vibrate at an earlier timing, the control time T1 may be set shorter than the control time T2.

In addition, in a state where the second state quantity (relative distance) falls below the first signal threshold (BF_TH), the controller CNT controls the first output circuitry 31 so that the first signal (BF_vibration) output therefrom is output at a constant value (436).

(Example of Mutual Cooperation of Risk HMIs in State of Low Arousal and During Excessive Stress)

When the biological information acquired from the driver is lower than a lower limit value of the threshold range shown in FIG. 3, the controller CNT determines that the state of the driver is a state of carelessness (hereinafter, a low-arousal state). In addition, when the acquired biological information is higher than an upper limit value of the threshold range, the controller CNT determines that the state of the driver is a state of tension (hereinafter, an excessive stress state). When the biological information is not in the threshold range as described above, the controller CNT controls output of the output signal (an audio signal or a vibration signal) of the first output circuitry 31 so as to guide the state of the driver (biological information of the driver) to within the threshold range.

FIG. 5 is a diagram showing an example of mutual cooperation between the first risk HMI and the second risk HMI with respect to during low arousal and during excessive stress.

In FIG. 5, ST51 indicates a relationship between time and a risk accompanying an approach by another vehicle (object) in the periphery. It is shown that, between a time of day T1 and a time of day T2, the other vehicle approaches the vehicle 200 (self-vehicle) and risk increases. It is also shown that, between the time of day T2 and a time of day T3, the other vehicle moves away from the vehicle 200 (self-vehicle) and risk decreases.

When the biological information acquired from the driver is lower than a lower limit of a predetermined threshold range, the controller CNT determines that the driver is in a low-arousal state and sets a first signal threshold (low-arousal time BF_TH) for during low arousal as the first signal threshold. In addition, when the biological information is higher than an upper limit of the predetermined threshold range, the controller CNT determines that the driver is in an excessive stress state and sets a first signal threshold (excessive stress time BF_TH) for during excessive stress as the first signal threshold. The first signal threshold (low-arousal time BF_TH) for during low arousal set above is larger than the first signal threshold (excessive stress time BF_TH) for during excessive stress set above.

In addition, when the biological information is lower than a lower limit of a predetermined threshold range, the controller CNT determines that the driver is in a low-arousal state and sets a second signal threshold (low-arousal time HMI_TH) for during low arousal as the second signal threshold. Furthermore, when the biological information is higher than an upper limit of the predetermined threshold range, the controller CNT determines that the driver is in an excessive stress state and sets a second signal threshold (excessive stress time HMI_TH) for during excessive stress as the second signal threshold. The second signal threshold (low-arousal time HMI_TH) for during low arousal set above is larger than the second signal threshold (excessive stress time HMI_TH) for during excessive stress set above.

When the biological state of the driver is the low-arousal state, it is necessary to set a time for outputting the first signal (BF_audio) as long as possible in order to guide the biological information to within the threshold range shown in FIG. 3. In addition, in the excessive stress state, it is also necessary to suppress further promotion of the excessive stress state due to sudden rises and falls of stereophonic sound.

By setting the first signal threshold (low-arousal time BF_TH) for during low arousal larger than the first signal threshold (excessive stress time BF_TH) for during excessive stress, an output time of the first signal (BF_audio) during which the first signal (BF_audio) is output at a maximum value (constant value) can be extended by a time T4 as compared to an output time of the first signal (BF_audio) during excessive stress. In addition, a rise (533) of stereophonic sound during excessive stress can be made more gradual than a rise (523) of stereophonic sound during low arousal.

In addition, by setting the second signal threshold (low-arousal time HMI_TH) for during low arousal larger than the second signal threshold (excessive stress time HMI_TH) for during excessive stress, a rise (525) of the first signal (BF_audio) during low arousal can be caused to occur earlier than a rise (535) of the first signal (BF_audio) during excessive stress. Accordingly, an output time of the first signal (BF_audio) during low arousal during which the first signal (BF_audio) is output at a maximum value (constant value) can be extended by a time T5 as compared to an output time of the first signal (BF_audio) during excessive stress. In addition, a rise (534) of stereophonic sound during excessive stress can be made more gradual than a rise (524) of stereophonic sound during low arousal.

(During Low Arousal)

ST52 indicates an example of mutual cooperation of risk HMIs during low arousal. ST52 indicates an example of mutual cooperation of a case where biofeedback (BF_audio) which uses an audio signal as an inductive stimulus is output in the first risk HMI and a case where a stereophonic sound (audio signal) is output in the second risk HMI. In ST52, an axis of abscissa represents time and an axis of ordinate represents signal intensity.

In a state where the first output circuitry 31 outputs BF_audio as the first signal (521), when the vehicle 200 is approached in such a manner that the second state quantity (relative distance) exceeds a first signal threshold (low-arousal time BF_TH) for biofeedback during low arousal, the controller CNT controls the first output circuitry 31 so that the first signal (BF_audio) output therefrom gradually decreases (522).

In a state where the second state quantity (relative distance) equals or exceeds a second signal threshold (low-arousal time HMI_TH) for risk HMI during low arousal which is larger than the first signal threshold (low-arousal time BF_TH) for biofeedback during low arousal, the controller CNT controls the second output circuitry 32 so that the second signal (stereophonic sound) output therefrom gradually increases (523). The controller CNT performs control so that, after the first signal decreases, output of the second signal by the second output circuitry 32 gradually increases.

In this case, while the second signal (stereophonic sound) is controlled so as to gradually increase by a curve (quadratic function) in the control state 523 of the second signal, the second signal (stereophonic sound) may be controlled so as to gradually increase by a straight line (linear function) as indicated by a control state 423 of the second signal shown in FIG. 4. In a state of closest approach by a risk, the controller CNT controls output of the second output circuitry 32 so that output continues at a maximum value (constant value) as indicated by a control state 527 of the second signal.

As the second state quantity (relative distance) increases and risk decreases, the controller CNT controls the second output circuitry 32 so that the second signal (stereophonic sound) output therefrom gradually decreases (524). While the second signal (stereophonic sound) is controlled so as to gradually decrease by a curve (quadratic function) in the control state 524 of the second signal in a similar manner to the control state 523 of the second signal, the second signal (stereophonic sound) may be controlled so as to gradually decrease by a straight line (linear function) as indicated by a control state 424 of the second signal shown in FIG. 4.

In a state where the second state quantity (relative distance) falls below the second signal threshold (low-arousal time HMI_TH) for risk HMI during low arousal, the controller CNT controls the first output circuitry 31 so that the first signal (BF_audio) output therefrom gradually increases (525). The controller CNT performs control so that, after the second signal decreases (524), output of the first signal by the first output circuitry 31 gradually increases (525).

In addition, in a state where the second state quantity (relative distance) falls below the first signal threshold (low-arousal time BF_TH) for biofeedback during low arousal, the controller CNT controls the first output circuitry 31 so that the first signal (BF_audio) output therefrom is output at a constant value (526).

(During Excessive Stress)

ST53 indicates an example of mutual cooperation of risk HMIs during excessive stress. ST53 indicates an example of mutual cooperation of a case where biofeedback (BF_audio) which uses an audio signal as an inductive stimulus is output in the first risk HMI and a case where a stereophonic sound (audio signal) is output in the second risk HMI. In ST53, an axis of abscissa represents time and an axis of ordinate represents signal intensity.

In a state where the first output circuitry 31 outputs BF_audio as the first signal (531), when the vehicle 200 is approached in such a manner that the second state quantity (relative distance) exceeds the first signal threshold (excessive stress time BF_TH) for biofeedback during excessive stress, the controller CNT controls the first output circuitry 31 so that the first signal (BF_audio) output therefrom gradually decreases (532).

In a state where the second state quantity (relative distance) equals or exceeds a second signal threshold (excessive stress time HMI_TH) for risk HMI during excessive stress which is larger than the first signal threshold (excessive stress time BF_TH) for biofeedback during excessive stress, the controller CNT controls the second output circuitry 32 so that the second signal (stereophonic sound) output therefrom gradually increases (533). The controller CNT performs control so that, after the first signal decreases (532), output of the second signal by the second output circuitry 32 gradually increases (533).

As the second state quantity (relative distance) increases and risk decreases, the controller CNT controls the second output circuitry 32 so that the second signal (stereophonic sound) output therefrom gradually decreases (534).

In a state where the second state quantity (relative distance) falls below the second signal threshold (excessive stress time HMI_TH) for risk HMI during excessive stress, the controller CNT controls the first output circuitry 31 so that the first signal (BF_audio) output therefrom gradually increases (535). The controller CNT performs control so that, after the second signal decreases (534), output of the first signal by the first output circuitry 31 gradually increases (535).

In addition, in a state where the second state quantity (relative distance) falls below the first signal threshold (excessive stress time BF_TH) for biofeedback during excessive stress, the controller CNT controls the first output circuitry 31 so that the first signal (BF_audio) output therefrom is output at a constant value (536).

(Processing Flow)

Figure 6A:
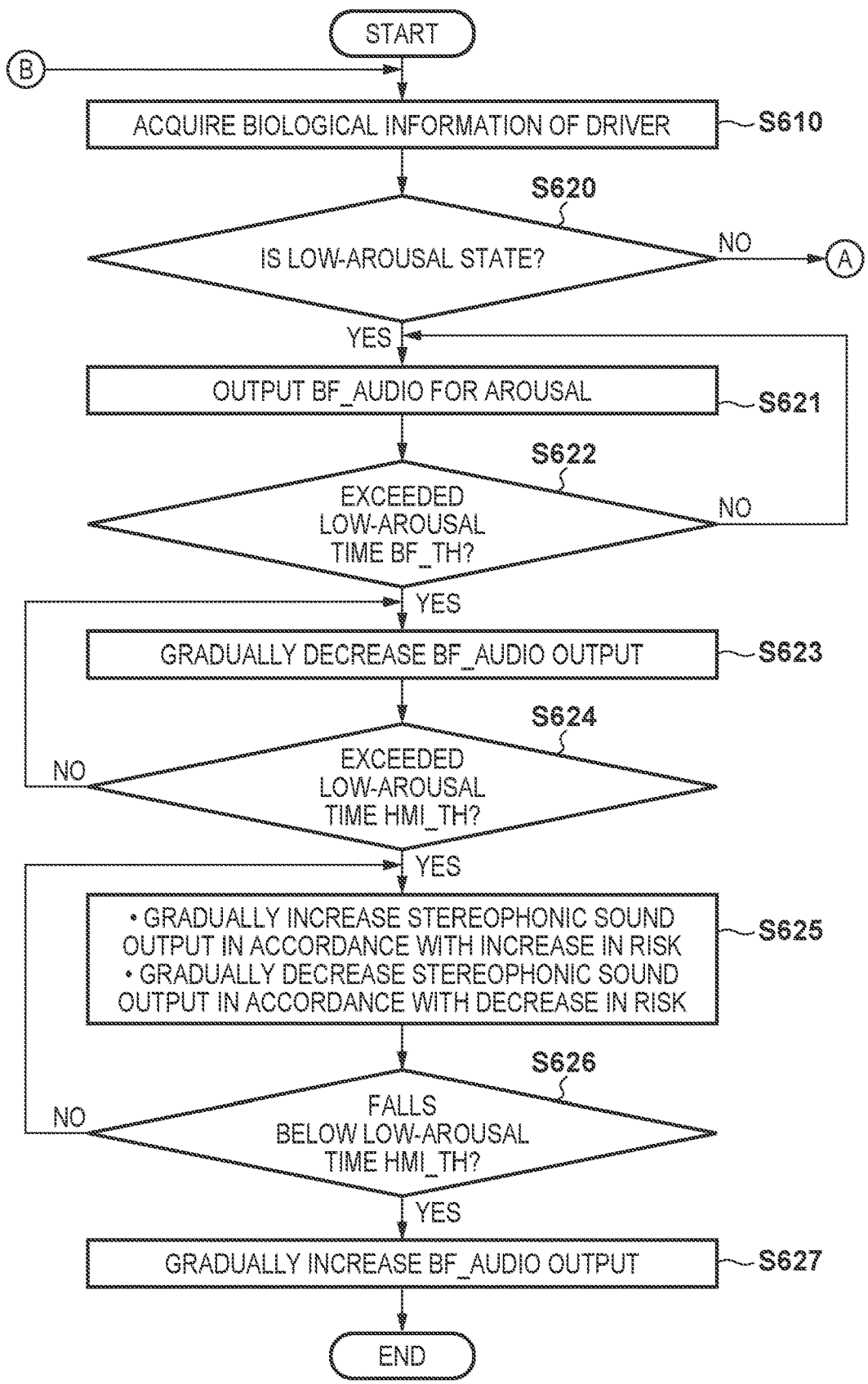
FIG. 6A is a diagram explaining a flow of processing in mutual cooperation between a first risk HMI and a second risk HMI (during low arousal)
Figure 6B:
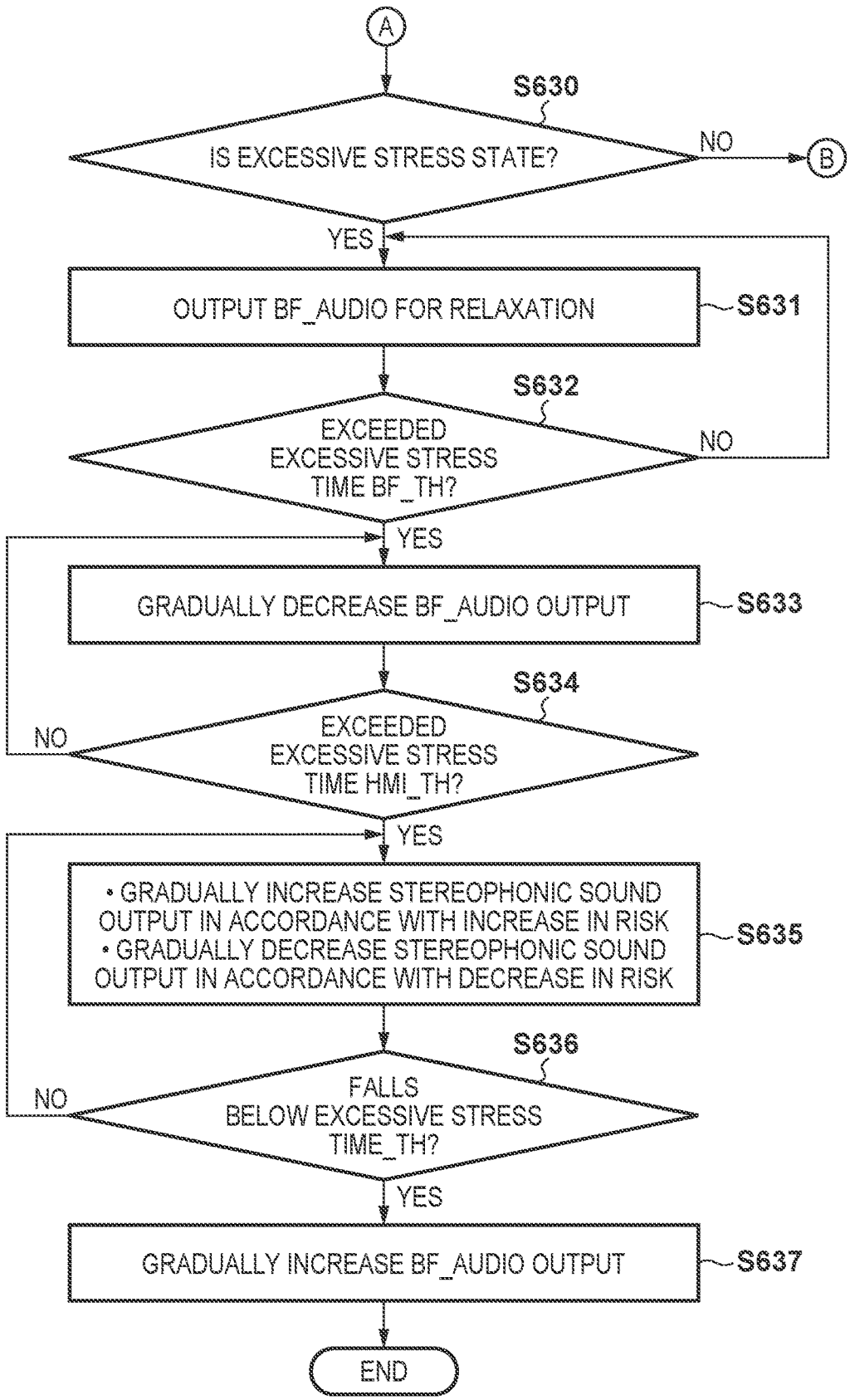
FIG. 6B is a diagram explaining a flow of processing in mutual cooperation between a first risk HMI and a second risk HMI (during excessive stress)

FIGS. 6A and 6B are diagrams for explaining a flow of processing in mutual cooperation between the first risk HMI and the second risk HMI with respect to during low arousal and during excessive stress.

In S610, the first detector 11 acquires biological information of the driver. In S620, the controller CNT compares the biological information with the lower limit value of the threshold range shown in FIG. 3, and when the biological information is lower than the lower limit value of the threshold range shown in FIG. 3 (S620—YES), the controller CNT determines that the state of the driver is a low-arousal state. On the other hand, when the biological information is equal to or higher than the lower limit value of the threshold range shown in FIG. 3 (S620—NO), processing is advanced to S630 shown in FIG. 6B.

(Processing Flow During Low Arousal)

In S621, the first output circuitry 31 outputs biofeedback (BF_audio) for arousal as the first signal (for example, 521).

In S622, the controller CNT determines whether the risk (second state quantity (relative distance)) has exceeded the first signal threshold (low-arousal time BF_TH) for biofeedback during low arousal, and when the risk has not exceeded the first signal threshold (low-arousal time BF_TH) (S622—NO), similar processing is repeated (S621).

On the other hand, when the risk exceeds the first signal threshold (low-arousal time BF_TH) (S622—YES), processing is advanced to S623.

In S623, the controller CNT controls the first output circuitry 31 so that the first signal (BF_audio) output therefrom gradually decreases (522: first signal gradual decrease).

In S624, the controller CNT determines whether the risk (second state quantity (relative distance)) has exceeded the second signal threshold (low-arousal time HMI_TH) for risk HMI during low arousal, and when the risk has not exceeded the second signal threshold (low-arousal time HMI_TH) (S624—NO), similar processing is repeated (S623).

On the other hand, when the risk exceeds the second signal threshold (low-arousal time HMI_TH) (S624—YES), processing is advanced to S625.

In S625, the controller CNT controls the second output circuitry 32 so that the second signal (stereophonic sound) output therefrom gradually increases in accordance with an increase in risk (523: second signal gradual increase). In addition, the controller CNT controls the second output circuitry 32 so that the second signal (stereophonic sound) output therefrom gradually decreases in accordance with a decrease in risk (524: second signal gradual decrease).

In S626, the controller CNT determines whether the risk (second state quantity (relative distance)) has fallen below the second signal threshold (low-arousal time HMI_TH) for risk HMI during low arousal, and when the risk has not fallen below the second signal threshold (low-arousal time HMI_TH) (S626-NO), similar processing is repeated (S625). On the other hand, when the risk falls below the second signal threshold (low-arousal time HMI_TH) (S626—YES), processing is advanced to S627.

In S627, the controller CNT controls the first output circuitry 31 so that the first signal (BF_audio) output therefrom gradually increases (525: first signal gradual increase).

In S630 in FIG. 6B, the controller CNT compares the biological information with the upper limit value of the threshold range shown in FIG. 3, and when the biological information is higher than the upper limit value of the threshold range shown in FIG. 3 (S630—YES), the controller CNT determines that the state of the driver is an excessive stress state. On the other hand, when the biological information is equal to or lower than the upper limit value of the threshold range shown in FIG. 3 (S630—NO), processing is returned to FIG. 6A. In this case, the biological information is within the threshold range and a BF signal is not output.

(Processing Flow During Excessive Stress)

In S631, the first output circuitry 31 outputs biofeedback (BF_audio) for relaxation as the first signal (531). The first output circuitry 31 outputs different first signals between a state where the biological information is lower than the lower limit of the predetermined threshold range and a state where the biological information is higher than the upper limit of the predetermined threshold range. In S621 described earlier, the first output circuitry 31 outputs biofeedback (BF_audio) for arousal with a high-intensity audio signal as the first signal, and in the present step, the first output circuitry 31 outputs biofeedback (BF_audio) for relaxation an audio signal of which is lower in intensity than the audio signal of the BF_audio for arousal. Accordingly, a suitable audio signal can be output in accordance with a biological state of the driver.

In S632, the controller CNT determines whether the risk (second state quantity (relative distance)) has exceeded the first signal threshold (excessive stress time BF_TH) for biofeedback during excessive stress, and when the risk has not exceeded the first signal threshold (excessive stress time BF_TH) (S632—NO), similar processing is repeated (S631).

On the other hand, when the risk exceeds the first signal threshold (excessive stress time BF_TH) (S632—YES), processing is advanced to S633.

In S633, the controller CNT controls the first output circuitry 31 so that the first signal (BF_audio) output therefrom gradually decreases (532: first signal gradual decrease).

In S634, the controller CNT determines whether the risk (second state quantity (relative distance)) has exceeded the second signal threshold (excessive stress time HMI_TH) for risk HMI during excessive stress, and when the risk has not exceeded the second signal threshold (excessive stress time HMI_TH) (S634-NO), similar processing is repeated (S633).

On the other hand, when the risk exceeds the second signal threshold (excessive stress time HMI_TH) (S634—YES), processing is advanced to S635.

In S635, the controller CNT controls the second output circuitry 32 so that the second signal (stereophonic sound) output therefrom gradually increases in accordance with an increase in risk (533: second signal gradual increase). In addition, the controller CNT controls the second output circuitry 32 so that the second signal (stereophonic sound) output therefrom gradually decreases in accordance with a decrease in risk (534: second signal gradual decrease).

In S636, the controller CNT determines whether the risk (second state quantity (relative distance)) has fallen below the second signal threshold (excessive stress time HMI_TH) for risk HMI during excessive stress, and when the risk has not fallen below the second signal threshold (S636—NO), similar processing is repeated (S635). On the other hand, when the risk falls below the second signal threshold (excessive stress time HMI_TH) (S636—YES), processing is advanced to S637.

In S637, the controller CNT controls the first output circuitry 31 so that the first signal (BF_audio) output therefrom gradually increases (535: first signal gradual increase).

Second Embodiment

In the first embodiment, mutual cooperation of risk HMIs in which a first risk HMI and a second risk HMI simulate a same sense has been described. BF_audio and stereophonic sound are signals that stimulate the same sense of hearing, and BF_vibration and a vibration signal that changes a tension of a seat belt are signals that stimulate the same sense of touch. In the present embodiment, a configuration will be described in which different senses (the sense of hearing, the sense of touch, and the sense of vision) of a driver are stimulated in the second risk HMI using an audio signal of stereophonic sound, a vibration signal that changes a tension of the seat belt 28, and a display signal that causes the displayer 151 of the display apparatus 150 to be displayed.

Figure 7:
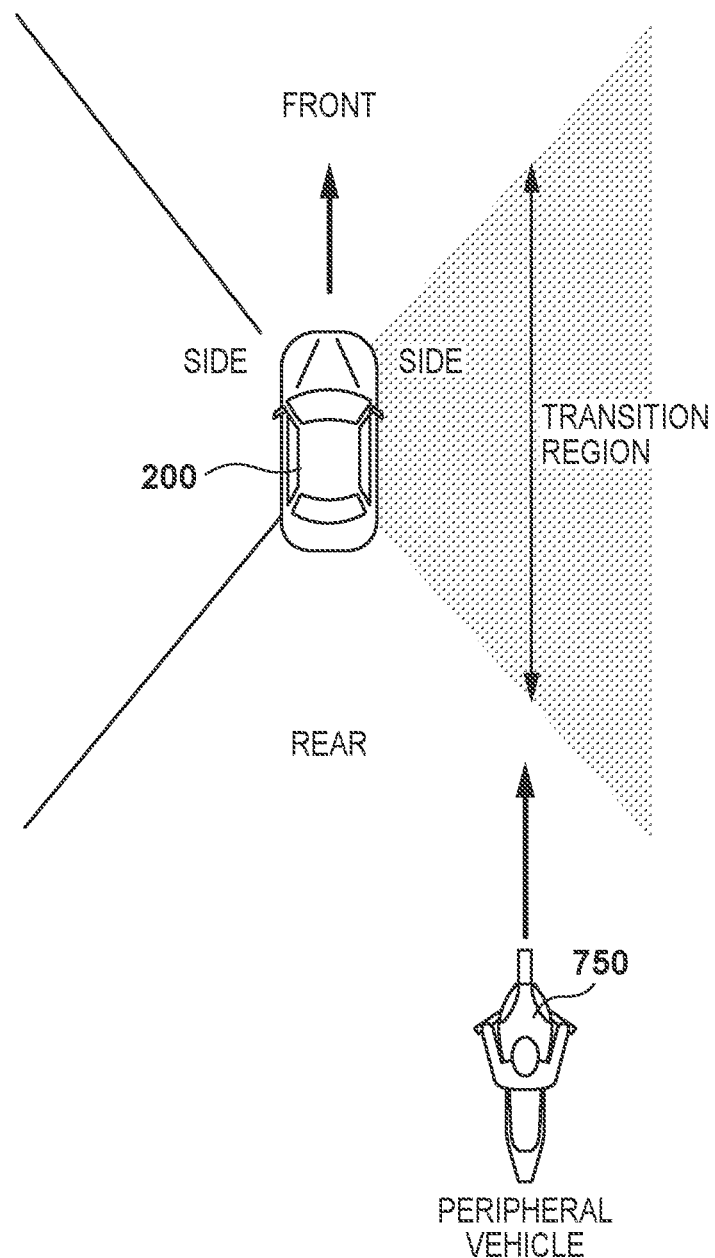
FIG. 7 is a diagram illustrating a relative positional relationship of a peripheral vehicle traveling in the rear of a vehicle.

FIG. 7 is a diagram illustrating a relative positional relationship of the vehicle 200 (self-vehicle) and an object (peripheral vehicle 750) traveling in the rear of the self-vehicle. As a second state quantity, the second detector 12 detects a distance (relative distance) between the peripheral vehicle 750 in a periphery of (in the rear, to the side, or in front of) the vehicle 200 and the vehicle 200 or a relative position of the peripheral vehicle 750 in the periphery with respect to the vehicle 200. The controller CNT acquires a relative distance of the object and a relative position of the object based on detected information of the second detector 12.

Figure 8:
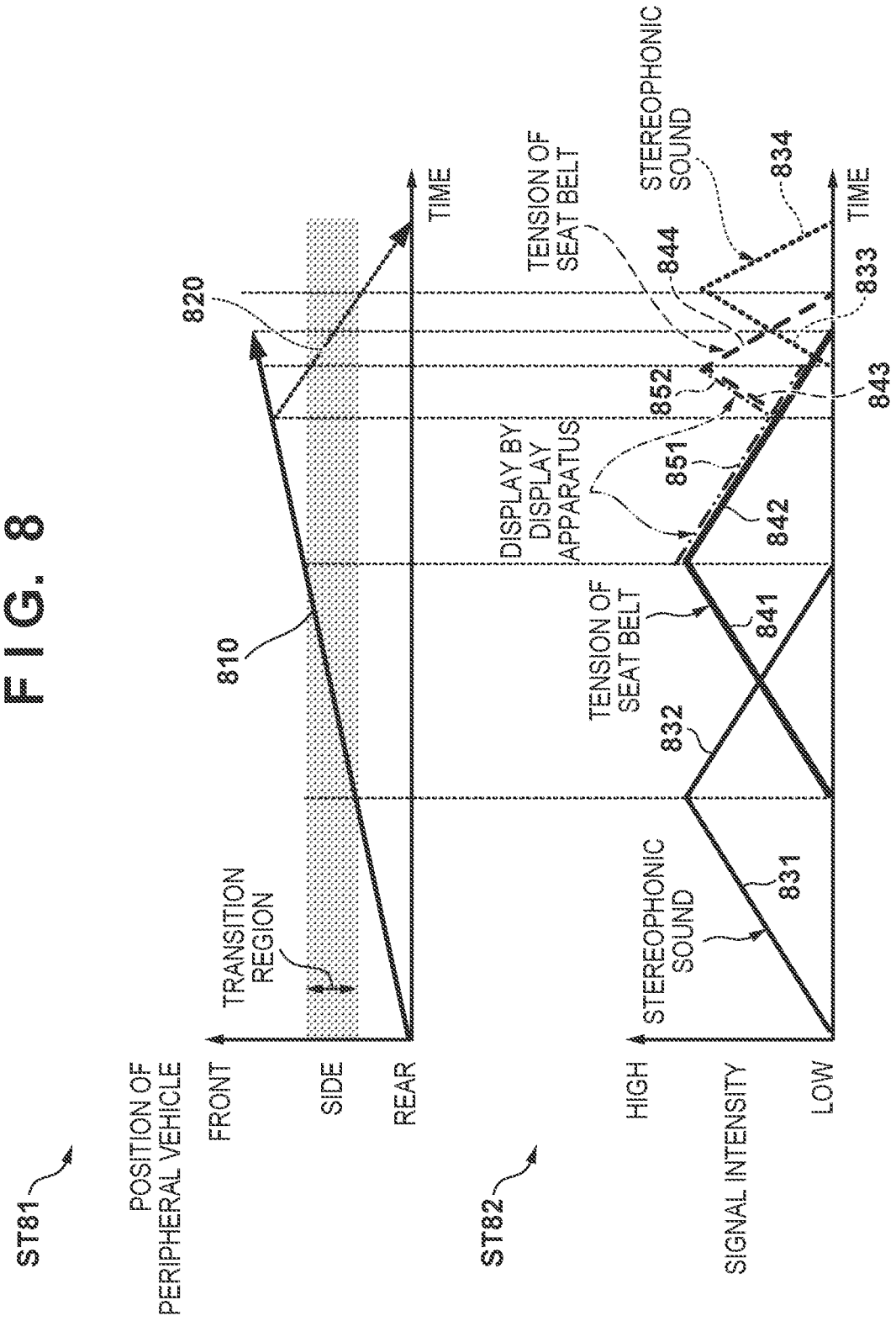
FIG. 8 is a diagram explaining mutual cooperation of various signals that stimulate different senses (a sense of hearing, a sense of touch, and a sense of vision) of the driver.

FIG. 8 is a diagram explaining mutual cooperation of various signals that stimulate different senses (the sense of hearing, the sense of touch, and the sense of vision) of the driver.

ST81 indicates a relationship between time and the relative position of the peripheral vehicle 750. An arrow 810 indicates a state where the peripheral vehicle 750 passes from the rear toward the front at a higher constant speed than the vehicle 200 (self-vehicle). In addition, an arrow 820 indicates a state where the peripheral vehicle 750 decelerates during the passing and once again approaches the vehicle 200 (self-vehicle). A region to the side of the vehicle 200 is a transition region in which a first signal and a second signal are output in an overlapping manner during a transition of output states of the first signal and the second signal. In the present embodiment, the first signal and the second signal are signals that each stimulate a different sense of the driver between the sense of touch and the sense of hearing.

ST82 indicates a diagram schematically showing changes in an audio signal of stereophonic sound, a vibration signal that changes a tension of the seat belt 28, and a display signal that causes the displayer 151 of the display apparatus 150 to be displayed.

In the present embodiment, based on a relative distance between the peripheral vehicle 750 present in the rear and to the side of the vehicle 200 and the vehicle 200 and a relative position of the peripheral vehicle 750 with respect to the vehicle 200 among the second state quantities, the first output circuitry 31 outputs an audio signal (stereophonic sound) for notifying the driver of the presence of the peripheral vehicle 750 as the first signal.

In addition, based on a relative distance between the peripheral vehicle 750 present to the side and in front of the vehicle 200 and the vehicle 200 and a relative position of the peripheral vehicle 750 with respect to the vehicle 200 among the second state quantities, the second output circuitry 32 outputs a vibration signal for changing a tension of the seat belt to notify the driver of the presence of the peripheral vehicle 750 as the second signal.

The controller CNT controls output of the first output circuitry and the second output circuitry in accordance with changes in the relative distance and the relative position. The controller CNT causes a transition of an output state of the first signal to an output state of the second signal or a transition of the output state of the second signal to the output state of the first signal to be performed in accordance with changes in the relative distance and the relative position in a region (transition region) to the side of the vehicle 200.

As indicated by ST82, the controller CNT controls output (output signal 831) of the first output circuitry 31 to gradually increase until the peripheral vehicle 750 approaches at a constant speed from the rear of the vehicle 200 and enters a region to the side of the vehicle 200. In addition, the controller CNT controls output (output signal 832) of the first output circuitry 31 to gradually decrease and controls output (output signal 841) of the second output circuitry 32 to gradually increase until, after the peripheral vehicle 750 enters the region to the side, the peripheral vehicle 750 passes the region to the side at a constant speed. The controller CNT controls output (output signal 841) of the second output circuitry 32 to gradually increase during a period in which output (output signal 832) of the first signal by the first output circuitry 31 gradually decreases in accordance with changes in the relative distance and the relative position.

In addition, the controller CNT controls output (output signal 842) of the second output circuitry 32 to gradually decrease in a state where, after the peripheral vehicle 750 passes the region to the side, the peripheral vehicle 750 travels a region in front of the vehicle 200 at a constant speed and the relative distance to the vehicle 200 increases.

In the present embodiment, based on a relative distance between the peripheral vehicle 750 present in front of the vehicle 200 and the vehicle 200 and a relative position of the peripheral vehicle 750 with respect to the vehicle 200 among the second state quantities, as a signal for stimulating the sense of vision of the driver, the second output circuitry 32 outputs a display signal for causing the displayer 151 of the display apparatus 150 to be displayed as a third signal to notify the driver of the presence of the peripheral vehicle 750 (output signals 851 and 852).

The controller CNT controls output (output signal 843) of the second signal by the second output circuitry 32 to gradually increase until the peripheral vehicle 750 approaches (reapproaches) at a constant speed from the front of the vehicle 200 and enters a region (transition region) to the side of the vehicle 200. In addition, the controller CNT controls output (output signal 844) of the second signal by the second output circuitry 32 to gradually decrease and controls output (output signal 833) of the first output circuitry 31 to gradually increase until, after the peripheral vehicle 750 enters the region to the side, the peripheral vehicle 750 passes the region to the side at a constant speed.

The controller CNT changes the output of the second output circuitry 32 in accordance with a change in a degree of proximity of the peripheral vehicle 750 present in front. For example, since risk decreases in a state where the relative distance between the peripheral vehicle 750 in front and the vehicle 200 increases, the controller CNT controls output (output signal 851) of the third signal by the second output circuitry 32 to gradually decrease. The controller CNT controls output (output signal 851) of the third signal by the second output circuitry 32 to gradually decrease in a similar manner to the output (output signal 842) of the second signal.

In addition, as indicated by the arrow 820, since risk increases in a state where the peripheral vehicle 750 decelerates during the passing and once again approaches the vehicle 200 (self-vehicle), the controller CNT controls output (output signal 852) of the third signal by the second output circuitry 32 to gradually increase. The controller CNT controls output (output signal 852) of the third signal by the second output circuitry 32 to gradually increase in a similar manner to the output (output signal 843) of the second signal.

The third signal for the display apparatus 150 is a signal for notifying the presence of the peripheral vehicle 750 in front and, when the peripheral vehicle 750 decelerates during the passing and enters the transition region to the side, the controller CNT controls the second output circuitry 32 and causes output of the third signal to stop.

As indicated by ST82 in FIG. 8, when the second output circuitry 32 outputs the second signal (vibration signal for changing a tension of the seat belt) during output of the first signal (an audio signal of stereophonic sound) by the first output circuitry 31, the controller CNT controls the output (output signal 832) by the first output circuitry 31 so as to gradually decrease and controls the output (output signal 841) by the second output circuitry 32 so as to gradually increase.

In a similar manner, when the first output circuitry 31 outputs the first signal (an audio signal of stereophonic sound) during output of the second signal (a vibration signal for changing a tension of the seat belt) by the second output circuitry 32, the controller CNT controls the output (output signal 844) of the second signal by the second output circuitry 32 so as to gradually decrease and controls the output (output signal 833) by the first output circuitry 31 so as to gradually increase.

In addition, the controller CNT controls output (output signal 834) of the first output circuitry 31 to gradually decrease in a state where, after the peripheral vehicle 750 passes the region (transition region) to the side, the peripheral vehicle 750 travels a region in the rear of the vehicle 200 at a constant speed and the relative distance to the vehicle increases.

(Processing Flow)

Figure 9:
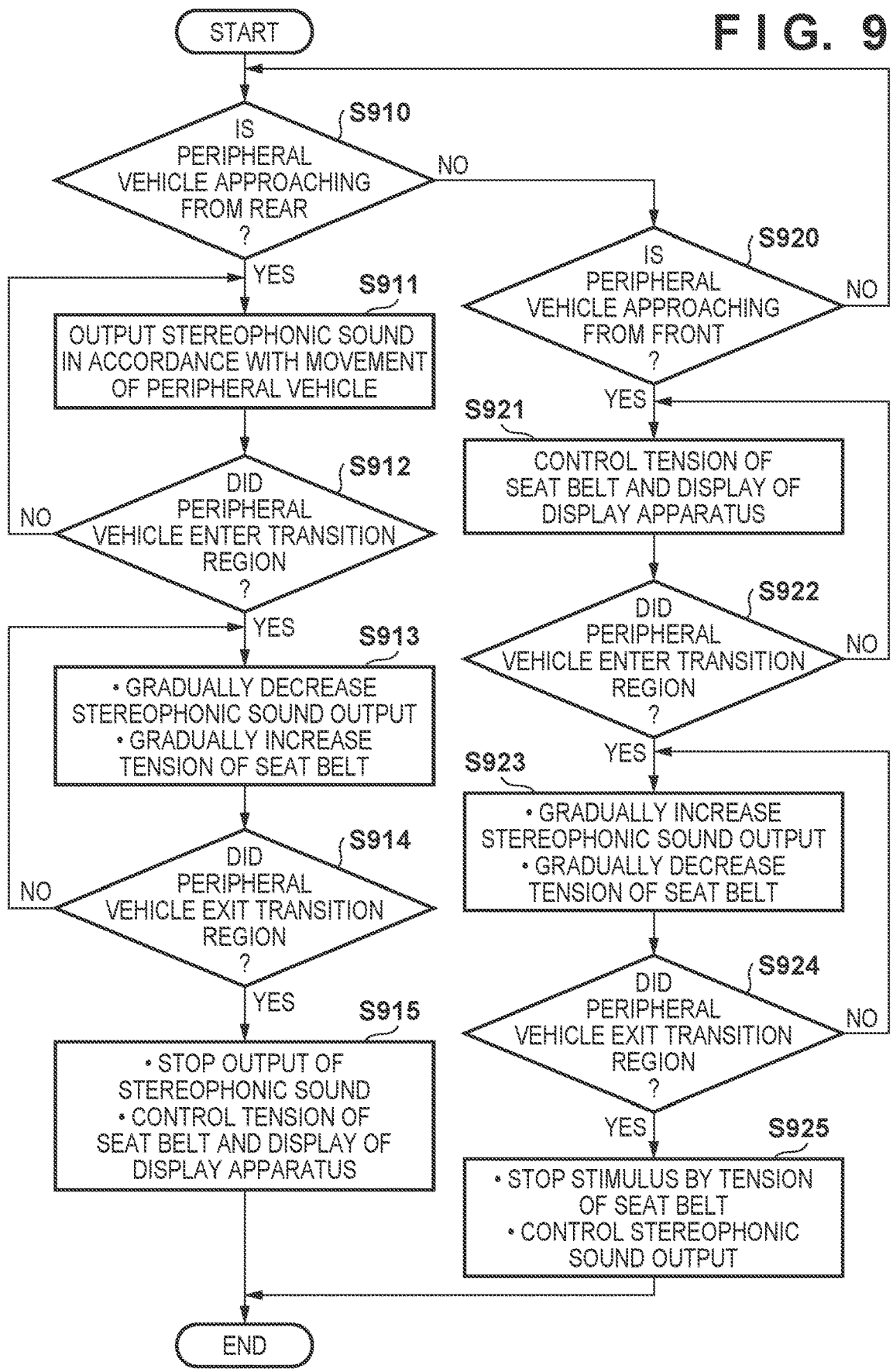
FIG. 9 is a diagram explaining a flow of processing in mutual cooperation of various signals that stimulate different senses of a driver.

FIG. 9 is a diagram explaining a flow of processing in mutual cooperation of various signals that stimulate different senses (the sense of hearing, the sense of touch, and the sense of vision) of the driver. In S910, the controller CNT determines whether the peripheral vehicle 750 is approaching from the rear based on information detected by the second detector 12. When the peripheral vehicle 750 is approaching from the rear (S910—YES), the controller CNT advances processing to S911.

In S911, the controller CNT controls output (output signal 831) of the first output circuitry 31 to gradually increase in accordance with a movement of the peripheral vehicle 750.

In S912, the controller CNT determines whether the peripheral vehicle 750 has entered the transition region (FIG. 8) based on information detected by the second detector 12. When the peripheral vehicle 750 has not entered the transition region (S912—NO), output control of the first output circuitry 31 in S911 is continued. On the other hand, when the peripheral vehicle 750 has entered the transition region (S912—YES), the processing is advanced to S913.

In S913, the controller CNT controls output (output signal 832) of the first output circuitry 31 to gradually decrease and controls output (output signal 841) of the second output circuitry 32 to gradually increase until, after the peripheral vehicle 750 enters the region to the side, the peripheral vehicle 750 passes the region to the side at a constant speed.

In S914, the controller CNT determines whether the peripheral vehicle 750 has exited the transition region based on information detected by the second detector 12. When the peripheral vehicle 750 has not exited the transition region (S914—NO), output control of the first output circuitry 31 and the second output circuitry 32 in S913 is continued. On the other hand, when the peripheral vehicle 750 has exited the transition region (S914—YES), the processing is advanced to S915.

An audio signal of a stereophonic sound is a signal for notifying a presence of an object in the rear and to the side of the vehicle 200 and, when the peripheral vehicle 750 moves to the front of the transition region, in S915, the controller CNT controls the first output circuitry 31 to stop output of the first signal (the audio signal of stereophonic sound). A vibration signal for changing a tension of a seat belt is a signal for notifying a presence of an object in front and to the side of the vehicle 200 and, even when the peripheral vehicle 750 moves to the front of the transition region, the controller CNT controls output of the second signal (the vibration signal for changing a tension of a seat belt) by the second output circuitry 32 in accordance with a distance (relative distance) to the peripheral vehicle 750.

Since a risk with respect to the vehicle 200 decreases in a state where, after the peripheral vehicle 750 passes the region to the side, the peripheral vehicle 750 travels a region in front of the vehicle 200 at a constant speed and the relative distance to the vehicle 200 increases, the controller CNT controls output (output signal 842) of the second signal (the vibration signal for changing a tension of a seat belt) by the second output circuitry 32 so as to gradually decrease in accordance with a distance to the peripheral vehicle 750.

In this case, a display signal (the third signal) for the display apparatus 150 is a signal for notifying a presence of an object in front of the vehicle 200 and, when the peripheral vehicle 750 moves to the front of the transition region, the controller CNT controls output (output signal 851) of the third signal for the display apparatus 150 by the second output circuitry 32 so as to gradually decrease in a similar manner to the output (output signal 842) of the second signal in accordance with a distance to the peripheral vehicle 750.

On the other hand, when the determination processing in S910 reveals that the peripheral vehicle 750 is not approaching from the rear (S910—NO), the controller CNT advances processing to S920.

In S920, the controller CNT determines whether the peripheral vehicle 750 is approaching from the front based on information detected by the second detector 12. When the peripheral vehicle 750 is not approaching from the front (S920—NO), the controller CNT returns processing to S910. On the other hand, when the peripheral vehicle 750 is approaching from the front (S920—YES), the controller CNT advances processing to S921.

In S921, the controller CNT controls output (output signal 843) of the second signal (the vibration signal for changing a tension of a seat belt) by the second output circuitry 32 so as to gradually increase in accordance with a distance to the peripheral vehicle 750. In addition, the controller CNT controls output (output signal 852) of the third signal for the display apparatus 150 by the second output circuitry 32 to gradually increase.

In S922, the controller CNT determines whether the peripheral vehicle 750 has entered the transition region (FIG. 8) based on information detected by the second detector 12. When the peripheral vehicle 750 has not entered the transition region (S922—NO), output control of the second output circuitry 32 in S921 is continued. On the other hand, when the peripheral vehicle 750 has entered the transition region (S922—YES), the processing is advanced to S923.

In S923, the controller CNT controls output (output signal 844) of the second signal (the vibration signal for changing a tension of a seat belt) by the second output circuitry 32 so as to gradually decrease and controls the output (output signal 833) of the first signal (the audio signal of stereophonic sound) by the first output circuitry 31 so as to gradually increase until, after the peripheral vehicle 750 enters the region to the side, the peripheral vehicle 750 passes the region to the side at a constant speed.

In S924, the controller CNT determines whether the peripheral vehicle 750 has exited the transition region based on information detected by the second detector 12. When the peripheral vehicle 750 has not exited the transition region (S924—NO), output control of the first output circuitry 31 and the second output circuitry 32 in S923 is continued. On the other hand, when the peripheral vehicle 750 has exited the transition region (S924—YES), the processing is advanced to S925.

In S925, the controller CNT controls the second output circuitry 32 and stops output of the second signal (the vibration signal for changing a tension of a seat belt) to stop stimulus by the tension of the seat belt. In addition, the controller CNT controls output of the first signal (the audio signal of stereophonic sound) by the first output circuitry 31 in accordance with a distance (relative distance) to the peripheral vehicle 750. The controller CNT controls output (output signal 834) of the first signal (the audio signal of stereophonic sound) by the first output circuitry 31 to gradually decrease in a state where, after the peripheral vehicle 750 passes the transition region to the side, the peripheral vehicle 750 travels a region in the rear of the vehicle 200 at a constant speed and the relative distance to the vehicle 200 increases.

(Modification)

In the second embodiment, a configuration has been described in which, by controlling output of the first signal (an audio signal of stereophonic sound) by the first output circuitry 31, a presence of the peripheral vehicle 750 in the rear or to the side of the vehicle 200 is notified.

As a modification of the second embodiment, when biological information acquired from the driver is not within a predetermined threshold range upon outputting an audio signal (an audio signal of stereophonic sound) for notifying the presence of an object (the peripheral vehicle 750), the controller CNT can also perform control so that output of the audio signal of stereophonic sound by the first output circuitry 31 is switched to output of a different audio signal for guiding the biological information to within the predetermined threshold range.

Figure 10:
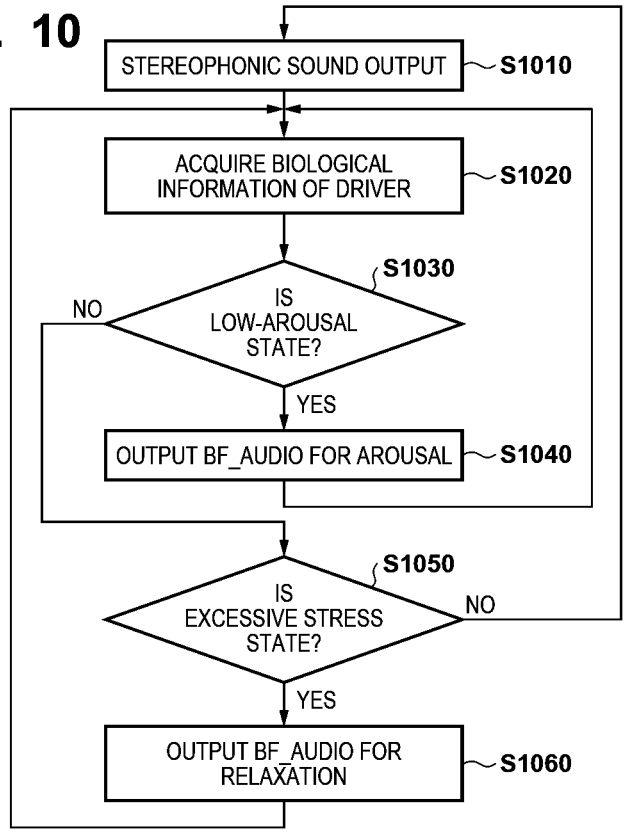
FIG. 10 is a diagram explaining a flow of processing according to a modification.

FIG. 10 is a diagram explaining a flow of processing according to a modification. In step S1010, the controller CNT controls output (output signal 831) of the first output circuitry 31 as indicated by the output signals 831 to 834 shown in FIG. 8. Based on the control by the controller CNT, the first output circuitry 31 outputs an audio signal (an audio signal of stereophonic sound) for notifying the presence of an object (the peripheral vehicle 750).

In S1020, the first detector 11 acquires biological information of the driver. In S1030, the controller CNT compares the biological information with a lower limit value of the threshold range shown in FIG. 3, and when the biological information is lower than the lower limit value of the threshold range shown in FIG. 3 (S1030—YES), the controller CNT determines that the state of the driver is a low-arousal state and advances processing to S1040.

In addition, in S1040, the controller CNT performs control so that the output signal (an audio signal of stereophonic sound) of the first output circuitry 31 is output after being switched to biofeedback (BF_audio) for arousal.

On the other hand, when the determination in S1050 reveals that the biological information is equal to or lower than the upper limit value of the threshold range shown in FIG. 3 (S1050—NO), processing is returned to S1010. In this case, switching of audio signals is not performed and, based on the control by the controller CNT, the first output circuitry 31 outputs an audio signal (an audio signal of stereophonic sound) for notifying the presence of an object (the peripheral vehicle 750).

On the other hand, when the determination processing in S1050 reveals that the biological information is higher than the upper limit value of the threshold range shown in FIG. 3 (S1050—YES), the controller CNT determines that the state of the driver is an excessive stress state and advances processing to S1060. When the biological information is equal to or lower than the upper limit value of the threshold range and the biological information is equal to or greater than the lower limit value of the threshold range shown in FIG. 3 (S1050—NO), processing is advanced to S1010.

In S1060, the controller CNT performs control so that the output signal (an audio signal of stereophonic sound) of the first output circuitry 31 is output after being switched to biofeedback (BF_audio) for relaxation.

In the present example, the controller CNT determines whether a driver is in a low-arousal state or an excessive stress state based on a comparison between acquired biological information of the driver and a threshold range (a lower limit value, an upper limit value), and in accordance with a determination result, the controller CNT outputs an audio signal of a stereophonic sound from the SPK2 after switching to biofeedback (BF_audio) for arousal or biofeedback (BF_audio) for relaxation. Accordingly, when notifying a presence of an object that is a risk object by an audio signal (stereophonic sound), the notification can be performed by switching to a suitable audio signal (BF_audio) in accordance with a biological state of the driver.

Summary of Embodiments

Configuration 1. A driver assistance apparatus according to the embodiments described above is a driver assistance apparatus (100) for assisting driving of a vehicle, including:
  a first detector (11) which detects first state information related to driving of the vehicle;
  a second detector (12) which detects second state information related to driving of the vehicle;
  first output circuitry (31) which outputs a first signal based on the first state information;
  second output circuitry (32) which outputs a second signal based on the second state information; and
  a controller (CNT) which controls output of the first output circuitry and the second output circuitry, wherein
  the controller (CNT)
  controls, when the second output circuitry performs output during output of the first signal by the first output circuitry, the output of the first output circuitry so as to gradually decrease and controls the output of the second output circuitry so as to gradually increase.

The driver assistance apparatus according to configuration 1 is capable of suppressing at least one of: a reduction in effectiveness due to interference of a plurality of signals; placing a driver under excessive stress due to an information overload; and giving the driver a sense of discomfort due to a signal for risk presentation being suddenly switched to another signal.

Configuration 2. The second detector (12) detects a distance between an object in a periphery of the vehicle and the vehicle as the second state information, and the controller (CNT) controls the output of the second output circuitry so as to change a variation of the second signal in accordance with a change in a degree of proximity of the object.

Configuration 3. Based on the distance detected by the second detector, the controller (CNT)

controls the output of the second output circuitry so that the variation of the second signal increases as the degree of proximity of the object increases, and controls the output of the second output circuitry so that the variation of the second signal decreases as the degree of proximity of the object decreases.

With the driver assistance apparatus according to configurations 2 and 3, by making intensity changes in accordance with a degree of risk of the second state information instead of simply making intensity changes for the sake of performing signal transitions, the driver can be notified of risks in a more natural manner.

Configuration 4. The first signal and the second signal are signals that stimulate a sense of touch of a driver of the vehicle or the first signal and the second signal are signals that stimulate a sense of hearing of the driver, and the controller (CNT)

performs control so that, after the first signal decreases, output of the second signal by the second output circuitry gradually increases, and performs control so that, after the second signal decreases, output of the first signal by the first output circuitry gradually increases.

The driver assistance apparatus according to configuration 4 is capable of suppressing interference of two signals that stimulate a same sense.

Configuration 5. The first detector (11) detects biological information of the driver as the first state information.

The driver assistance apparatus according to configuration 5 can preferentially acquire a signal related to a factor with a higher risk among various risk factors and use the acquired signal for biofeedback to the driver.

Configuration 6. The controller (CNT) determines whether or not the biological information is within a predetermined threshold range, and the first output circuitry (31) outputs different first signals between a state where the biological information is lower than a lower limit of the predetermined threshold range and a state where the biological information is higher than an upper limit of the predetermined threshold range based on the determination by the controller.

The driver assistance apparatus according to configuration 6 determines whether a driver is in a low-arousal state or an excessive stress state based on a comparison between acquired biological information of the driver and a threshold range (a lower limit value, an upper limit value), and in accordance with a determination result, switching is performed to biofeedback for arousal or biofeedback for relaxation and an output is performed. Accordingly, a suitable audio signal can be output in accordance with the biological state of the driver.

Configuration 7. The first output circuitry (31) outputs an audio signal for guiding the biological information to within the predetermined threshold range as the first signal, the second output circuitry (32) outputs an audio signal for notifying the driver of a presence of an object present in a periphery of the vehicle as the second signal, and the controller (CNT)

controls the first signal output from the first output circuitry in a state where the second state information exceeds a first signal threshold so as to gradually decrease, and controls the second signal output from the second output circuitry in a state where the second state information exceeds a second signal threshold which is larger than the first signal threshold so as to gradually increase.

The driver assistance apparatus according to configuration 7 is capable of causing the first signal to make a transition to the second signal at an appropriate timing when performing switching of output signals.

Configuration 8. The first output circuitry (31) outputs a vibration signal for vibrating a seat on which the driver sits as the first signal in order to guide the biological information to within the predetermined threshold range, the second output circuitry (32) outputs a vibration signal for changing a tension of a seat belt as the second signal in order to notify the driver of a presence of an object present in a periphery of the vehicle, and the controller (CNT)

controls the first signal output from the first output circuitry in a state where the second state information exceeds a first signal threshold so as to gradually decrease, and controls the second signal output from the second output circuitry in a state where the second state information exceeds a second signal threshold which is larger than the first signal threshold so as to gradually increase.

The driver assistance apparatus according to configuration 8 is capable of causing the first signal to make a transition to the second signal at an appropriate timing when performing switching of output signals.

Configuration 9. The controller (CNT)

determines that, when the biological information is lower than a lower limit of a predetermined threshold range, the driver is in a low-arousal state and sets a first signal threshold for during low arousal as the first signal threshold, determines that, when the biological information is higher than an upper limit of the predetermined threshold range, the driver is in an excessive stress state and sets a first signal threshold for during excessive stress as the first signal threshold, and the first signal threshold for during low arousal is larger than the first signal threshold for during excessive stress.

With the driver assistance apparatus according to configuration 9, by setting the first signal threshold (low-arousal time BF_TH) for during low arousal larger than the first signal threshold (excessive stress time BF_TH) for during excessive stress, a longer time can be secured for an output time of the first signal (BF_audio) as compared to an output time of the first signal (BF_audio) during excessive stress (for example, the output time of the first signal (BF_audio) can be extended by a time T4 shown in FIG. 5). Accordingly, when there is a possibility that the driver is driving in a low-arousal state or, in other words, in a state of carelessness, the biological information of the driver can be effectively guided to a normal state within a predetermined threshold range.

Configuration 10. The controller (CNT)
determines that, when the biological information is lower than a lower limit of a predetermined threshold range, the driver is in a low-arousal state and sets a second signal threshold for during low arousal as the second signal threshold,
determines that, when the biological information is higher than an upper limit of the predetermined threshold range, the driver is in an excessive stress state and sets a second signal threshold for during excessive stress as the second signal threshold, and
the second signal threshold for during low arousal is larger than the second signal threshold for during excessive stress.

With the driver assistance apparatus according to configuration 10, output (for example, 533 and 534 in FIG. 5) of a stereophonic sound during excessive stress can be made more gradual than output (for example, 523 and 524 in FIG. 5) of a stereophonic sound during low arousal and the driver can be prevented from entering a state of further excessive stress.

Configuration 11. The first signal and the second signal are signals that each stimulate a different sense of a driver of the vehicle between the sense of touch and the sense of hearing, and
the controller (CNT) controls output of the second output circuitry to gradually increase during a period in which output of the first signal by the first output circuitry gradually decreases.

With the driver assistance apparatus according to configuration 11, since a possibility of a reduction in effectiveness due to interference is relatively low in a case of two signals that stimulate different senses, by controlling the output of the second output circuitry to gradually increase during a period in which output of the first signal by the first output circuitry gradually decreases, switching between the first signal and the second signal can be smoothly performed.

Configuration 12. The second detector (12) detects a relative distance and a relative position of an object in a periphery with respect to the vehicle as second state information.

With the driver assistance apparatus according to configuration 12, a relative distance and a relative position can be used for notification of a risk object using a stereophonic sound or a change in tension of a seat belt.

Configuration 13. The first output circuitry (31) outputs, based on a relative distance between an object present in the rear and to the side of the vehicle and the vehicle and a relative position of the object with respect to the vehicle among the second state information, an audio signal for notifying the driver of the presence of the object as the first signal,
the second output circuitry (32) outputs, based on a relative distance between an object present to the side and in front of the vehicle and the vehicle and a relative position of the object with respect to the vehicle among the second state information, a vibration signal for changing a tension of a seat belt in order to notify the driver of the presence of the object as the second signal, and
the controller (CNT)
controls output of the first output circuitry and the second output circuitry in accordance with changes in the relative distance and the relative position.

With the driver assistance apparatus according to configuration 13, notification of a risk object can be performed using signals that stimulate different senses (the sense of hearing, the sense of touch) of the driver.

Configuration 14. A region to the side of the vehicle is a transition region in which the first signal and the second signal are output in an overlapping manner, and
the controller (CNT)
causes a transition of an output state of the first signal to an output state of the second signal or a transition of the output state of the second signal to the output state of the first signal to be performed in accordance with changes in the relative distance and the relative position in the transition region.

Configuration 15. The controller (CNT)
controls output of the first output circuitry to gradually increase until the object approaches from the rear of the vehicle and enters a region to the side of the vehicle, and
controls output of the first output circuitry to gradually decrease and controls output of the second output circuitry to gradually increase until, after the object enters the region to the side, the object passes the region to the side.

Configuration 16. The controller (CNT)
controls output of the second output circuitry to gradually decrease in a state where, after the object passes the region to the side, the object travels a region in front of the vehicle and a relative distance to the vehicle increases.

With the driver assistance apparatus according to configurations 14 to 16, notification of a risk object can be performed while smoothly switching output states of signals that stimulate different senses (the sense of hearing, the sense of touch) of the driver in accordance with changes in a relative distance and a relative position.

Configuration 17. The second output circuitry (32) outputs, based on a relative distance between an object present in front of the vehicle and the vehicle and a relative position of the object with respect to the vehicle among the second state information, a display signal for causing a display apparatus (150) to be displayed as a third signal in order to notify the driver of the presence of the object, and
the controller (CNT) changes an output of the second output circuitry in accordance with a change in a degree of proximity of the object present in front.

With the driver assistance apparatus according to configuration 17, notification of a risk object can be effectively performed by changing an output state of a signal that stimulates the sense of vision of the driver in accordance with a change in a degree of proximity of the object.

Configuration 18. The controller (CNT)
controls output of the second output circuitry to gradually increase until the object approaches from the front of the vehicle and enters a region to the side of the vehicle, and
controls output of the second output circuitry to gradually decrease and controls output of the first output circuitry to gradually increase until, after the object enters the region to the side, the object passes the region to the side.

Configuration 19. The controller (CNT)
controls output of the first output circuitry to gradually decrease in a state where, after the object passes the region to the side, the object travels a region in the rear of the vehicle and a relative distance to the vehicle increases.

With the driver assistance apparatus according to configurations 18 to 19, notification of a risk object can be performed while smoothly switching output states of signals that stimulate different senses (the sense of hearing, the sense of touch) of the driver in accordance with changes in a relative distance and a relative position.

Configuration 20. When biological information acquired from the driver is not within a predetermined threshold range upon the first output circuitry (31) outputting an audio signal for notifying a presence of the object, the controller (CNT) performs control so that output of the audio signal by the first output circuitry is switched to output of a different audio signal for guiding the biological information to within the predetermined threshold range.

With the driver assistance apparatus according to configuration 20, when notifying a presence of an object that is a risk object by an audio signal (stereophonic sound), the notification can be performed by switching to a suitable audio signal (BF_audio) in accordance with a biological state of the driver.

Configuration 21. The vehicle according to the embodiments described above includes the driver assistance apparatus according to any one of configurations 1 to 20 described above.

With the vehicle according to configuration 21, a vehicle can be provided which includes a driver assistance apparatus capable of suppressing at least one of: a reduction in effectiveness due to interference of a plurality of signals; placing a driver under excessive stress due to an information overload; and giving the driver a sense of discomfort due to a signal for risk presentation being suddenly switched to another signal.

Other Embodiments

The present invention also enables a program for realizing the functions of the embodiments described above to be supplied to a system or to a driver assistance apparatus constituting the system via a network or a storage medium, and enables one or more processors in a computer of the driver assistance apparatus to read the program and execute processing of the driver assistance apparatus.

The invention is not limited to the foregoing embodiments, and various variations/changes are possible within the spirit of the invention.

What is claimed is:

1. A driver assistance apparatus for assisting driving of a vehicle, comprising:
 a first detector which detects first state information related to driving of the vehicle;
 a second detector which detects second state information related to driving of the vehicle;
 a first output circuitry which outputs a first signal to a driver of the vehicle based on the first state information; the first signal indicating a state of the driver of the vehicle;
 a second output circuitry which outputs a second signal to the driver of the vehicle based on the second state information; the second signal indicating information related to a presence of an object in a periphery of the vehicle; and
 a controller which controls different intensities of the first signal and the second signal of the first output circuitry and the second output circuitry, wherein the controller controls, when the second output circuitry outputs the second signal during output of the first signal by the first output circuitry, the output of the first output circuitry so as to gradually decrease and controls the output of the second output circuitry so as to gradually increase.

2. The driver assistance apparatus according to claim 1, wherein the second detector detects a distance between the object in the periphery of the vehicle and the vehicle as the second state information, and
 the controller controls the output of the second output circuitry so as to change a variation of the second signal in accordance with a change in a degree of proximity of the object.

3. The driver assistance apparatus according to claim 2, wherein based on the distance detected by the second detector, the controller
 controls the output of the second output circuitry so that the variation of the second signal increases as the degree of proximity of the object increases, and
 controls the output of the second output circuitry so that the variation of the second signal decreases as the degree of proximity of the object decreases.

4. The driver assistance apparatus according to claim 1, wherein the first signal and the second signal are signals that stimulate a sense of touch of the driver of the vehicle or the first signal and the second signal are signals that stimulate a sense of hearing of the driver, and
 the controller
 performs control so that, after the first signal decreases, output of the second signal by the second output circuitry gradually increases, and
 performs control so that, after the second signal decreases, output of the first signal by the first output circuitry gradually increases.

5. The driver assistance apparatus according to claim 4, wherein the first detector detects biological information of the driver as the first state information.

6. The driver assistance apparatus according to claim 5, wherein the controller determines whether or not the biological information is within a predetermined threshold range, and
 the first output circuitry outputs different first signals between a state where the biological information is lower than a lower limit of the predetermined threshold range and a state where the biological information is higher than an upper limit of the predetermined threshold range based on the determination by the controller.

7. The driver assistance apparatus according to claim 6, wherein the first output circuitry outputs an audio signal for guiding the biological information to within the predetermined threshold range as the first signal,
 the second output circuitry outputs an audio signal for notifying the driver of the presence of the object present in the periphery of the vehicle as the second signal, and
 the controller
 controls the first signal output from the first output circuitry in a state where the second state information exceeds a first signal threshold so as to gradually decrease, and
 controls the second signal output from the second output circuitry in a state where the second state information exceeds a second signal threshold which is larger than the first signal threshold so as to gradually increase.

8. The driver assistance apparatus according to claim 6, wherein the first output circuitry outputs a vibration signal for vibrating a seat on which the driver sits as the first signal in order to guide the biological information to within the predetermined threshold range, the second output circuitry outputs a vibration signal for changing a tension of a seat belt as the second signal in order to notify the driver of the presence of the object present in the periphery of the vehicle, and the controller controls the first signal output from the first output circuitry in a state where the second state information exceeds a first signal threshold so as to gradually decrease, and controls the second signal output from the second output circuitry in a state where the second state information exceeds a second signal threshold which is larger than the first signal threshold so as to gradually increase.

9. The driver assistance apparatus according to claim 7, wherein the controller determines that, when the biological information is lower than a lower limit of a predetermined threshold range, the driver is in a low-arousal state and sets a first signal threshold for during low arousal as the first signal threshold, determines that, when the biological information is higher than an upper limit of the predetermined threshold range, the driver is in an excessive stress state and sets a first signal threshold for during excessive stress as the first signal threshold, and the first signal threshold for during low arousal is larger than the first signal threshold for during excessive stress.

10. The driver assistance apparatus according to claim 8, wherein the controller determines that, when the biological information is lower than a lower limit of a predetermined threshold range, the driver is in a low-arousal state and sets a second signal threshold for during low arousal as the second signal threshold, determines that, when the biological information is higher than an upper limit of the predetermined threshold range, the driver is in an excessive stress state and sets a second signal threshold for during excessive stress as the second signal threshold, and the second signal threshold for during low arousal is larger than the second signal threshold for during excessive stress.

11. The driver assistance apparatus according to claim 1, wherein the first signal and the second signal are signals that each stimulate a different sense of the driver of the vehicle between the sense of touch and the sense of hearing, and the controller controls output of the second output circuitry to gradually increase during a period in which output of the first signal by the first output circuitry gradually decreases.

12. The driver assistance apparatus according to claim 11, wherein the second detector detects a relative distance and a relative position of the object in the periphery with respect to the vehicle as the second state information.

13. The driver assistance apparatus according to claim 12, wherein the first output circuitry outputs, based on a relative distance between the object present in the rear and to the side of the vehicle and the vehicle and a relative position of the object with respect to the vehicle among the second state information, an audio signal for notifying the driver of the presence of the object as the first signal, the second output circuitry outputs, based on a relative distance between the object present to the side and in front of the vehicle and the vehicle and a relative position of the object with respect to the vehicle among the second state information, a vibration signal for changing a tension of a seat belt in order to notify the driver of the presence of the object as the second signal, and the controller controls output of the first output circuitry and the second output circuitry in accordance with changes in the relative distance and the relative position.

14. The driver assistance apparatus according to claim 12, wherein a region to the side of the vehicle is a transition region in which the first signal and the second signal are output in an overlapping manner, and the controller causes a transition of an output state of the first signal to an output state of the second signal or a transition of the output state of the second signal to the output state of the first signal to be performed in accordance with changes in the relative distance and the relative position in the transition region.

15. The driver assistance apparatus according to claim 12, wherein the controller controls output of the first output circuitry to gradually increase until the object approaches from the rear of the vehicle and enters a region to the side of the vehicle, and controls output of the first output circuitry to gradually decrease and controls output of the second output circuitry to gradually increase until, after the object enters the region to the side, the object passes the region to the side.

16. The driver assistance apparatus according to claim 15, wherein the controller controls output of the second output circuitry to gradually decrease in a state where, after the object passes the region to the side, the object travels a region in front of the vehicle and a relative distance to the vehicle increases.

17. The driver assistance apparatus according to claim 16, wherein the second output circuitry outputs, based on a relative distance between the object present in front of the vehicle and the vehicle and a relative position of the object with respect to the vehicle among the second state information, a display signal for causing a display apparatus to be displayed as a third signal in order to notify the driver of the presence of the object, and the controller changes an output of the second output circuitry in accordance with a change in a degree of proximity of the object present in front.

18. The driver assistance apparatus according to claim 16, wherein the controller controls output of the second output circuitry to gradually increase until the object approaches from the front of the vehicle and enters a region to the side of the vehicle, and controls output of the second output circuitry to gradually decrease and controls output of the first output circuitry to gradually increase until, after the object enters the region to the side, the object passes the region to the side.

19. The driver assistance apparatus according to claim 16, wherein the controller controls output of the first output circuitry to gradually decrease in a state where, after the object passes the region to the side, the object travels a region in the rear of the vehicle and a relative distance to the vehicle increases.

20. The driver assistance apparatus according to claim 12, wherein when biological information acquired from the driver is not within a predetermined threshold range upon the first output circuitry outputting an audio signal for notifying a presence of the object, the controller performs control so that output of the audio signal by the first output circuitry is switched to output of a different audio signal for guiding the biological information to within the predetermined threshold range.

21. A vehicle comprising the driver assistance apparatus for assisting driving of the vehicle, comprising a first detector which detects first state information related to driving of the vehicle;

a second detector which detects second state information related to driving of the vehicle;

a first output circuitry which outputs a first signal to a driver of the vehicle based on the first state information; the first signal indicating a state of the driver of the vehicle;

a second output circuitry which outputs a second signal to the driver of the vehicle based on the second state information; the second signal indicating information related to a presence of an object in a periphery of the vehicle; and a controller which controls different intensities of the first signal and the second signal of the first output circuitry and the second output circuitry, wherein the controller controls, when the second output circuitry outputs the second signal during output of the first signal by the first output circuitry, the output of the first output circuitry so as to gradually decrease and controls the output of the second output circuitry so as to gradually increase.

* * * * *